(12) United States Patent
Yoshioka et al.

(10) Patent No.: US 12,342,218 B2
(45) Date of Patent: Jun. 24, 2025

(54) TERMINAL AND COMMUNICATION METHOD TO IMPLEMENT UNICAST COMMUNICATION SUITABLE FOR POWER SAVING OPERATION IN TERMINAL-TO-TERMINAL DIRECT COMMUNICATION

(71) Applicant: NTT DOCOMO, INC., Tokyo (JP)

(72) Inventors: Shohei Yoshioka, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 283 days.

(21) Appl. No.: 18/004,786

(22) PCT Filed: Aug. 3, 2020

(86) PCT No.: PCT/JP2020/029724
§ 371 (c)(1),
(2) Date: Jan. 9, 2023

(87) PCT Pub. No.: WO2022/029854
PCT Pub. Date: Feb. 10, 2022

(65) Prior Publication Data
US 2023/0239732 A1    Jul. 27, 2023

(51) Int. Cl.
*H04W 28/04* (2009.01)
*H04W 76/18* (2018.01)
*H04W 76/23* (2018.01)
*H04W 76/25* (2018.01)

(52) U.S. Cl.
CPC ............ *H04W 28/04* (2013.01); *H04W 76/18* (2018.02); *H04W 76/23* (2018.02); *H04W 76/25* (2018.02)

(58) Field of Classification Search
CPC ..... H04W 28/04; H04W 76/18; H04W 76/23; H04W 76/25; H04W 72/25; H04W 92/18
See application file for complete search history.

(56) References Cited

U.S. PATENT DOCUMENTS

| 11,224,007 B2 * | 1/2022 | Rao .................... H04W 8/24 |
| 2014/0161111 A1 * | 6/2014 | Kim .................. H04W 56/0045 370/336 |
| 2018/0302820 A1 * | 10/2018 | Heo ................. H04W 36/0061 |
| 2019/0174530 A1 * | 6/2019 | Kim .................. H04W 72/0446 |
| 2021/0084586 A1 * | 3/2021 | Loehr .................. H04W 76/28 |
| 2021/0227620 A1 * | 7/2021 | Pan ........................ H04W 4/40 |

(Continued)

OTHER PUBLICATIONS

International Search Report issued in Application No. PCT/JP2020/029724 mailed on Dec. 15, 2020 (7 pages).

(Continued)

*Primary Examiner* — Afshawn M Towfighi
(74) *Attorney, Agent, or Firm* — Osha Bergman Watanabe & Burton LLP

(57) ABSTRACT

A terminal includes: a control unit configured to connect to another terminal in an RRC (Radio Resource Control) layer; and a transmitting unit configured to transmit data to the another terminal. In a case where the another terminal or the terminal itself performs at least one of transmission, reception, and sensing during a specific timing, the control unit controls an operation related to the connection in the RRC layer, based on the specific timing.

4 Claims, 14 Drawing Sheets

(56) References Cited

U.S. PATENT DOCUMENTS

2021/0360702 A1* 11/2021 Jang .................... H04W 74/006
2022/0046596 A1* 2/2022 Chen ................. H04W 72/0446
2023/0284285 A1* 9/2023 Jang ................. H04W 74/0891
370/311

OTHER PUBLICATIONS

Written Opinion issued in Application No. PCT/JP2020/029724 mailed on Dec. 15, 2020 (4 pages).
Mediatek, Inc., "RLM and state modelling based on PC5-S connection", 3GPP TSG-RAN WG2 Meeting #106, R2-1906027, Reno, Nevada, USA, May 13-17, 2019 (4 pages).
Kyocera, "RLF handling under multiple PC5-RRC connections" 3GPP TSG-RAN WG2 #109bis-e, R2-2003347, Online, Apr. 20-30, 2020 (5 pages).
3GPP TR 22.886 V15.1.0, "3rd Generation Partnership Project; Technical Specification Group Services and System Aspects; Study on enhancement of 3GPP Support for 5G V2X Services (Release 15)" Mar. 2017 (58 pages).
3GPP TS 38.211 V16.2.0, "3rd Generation Partnership Project; Technical Specification Group Radio Access Network; NR; Physical channels and modulation (Release 16)" Jun. 2020 (131 pages).
Office Action issued in Chinese Application No. 202080104648.7, dated Jun. 24, 2024 (14 pages).
Office Action issued in counterpart Japanese Patent Application No. 2022-541349 mailed on Apr. 23, 2024 (6 pages).

* cited by examiner

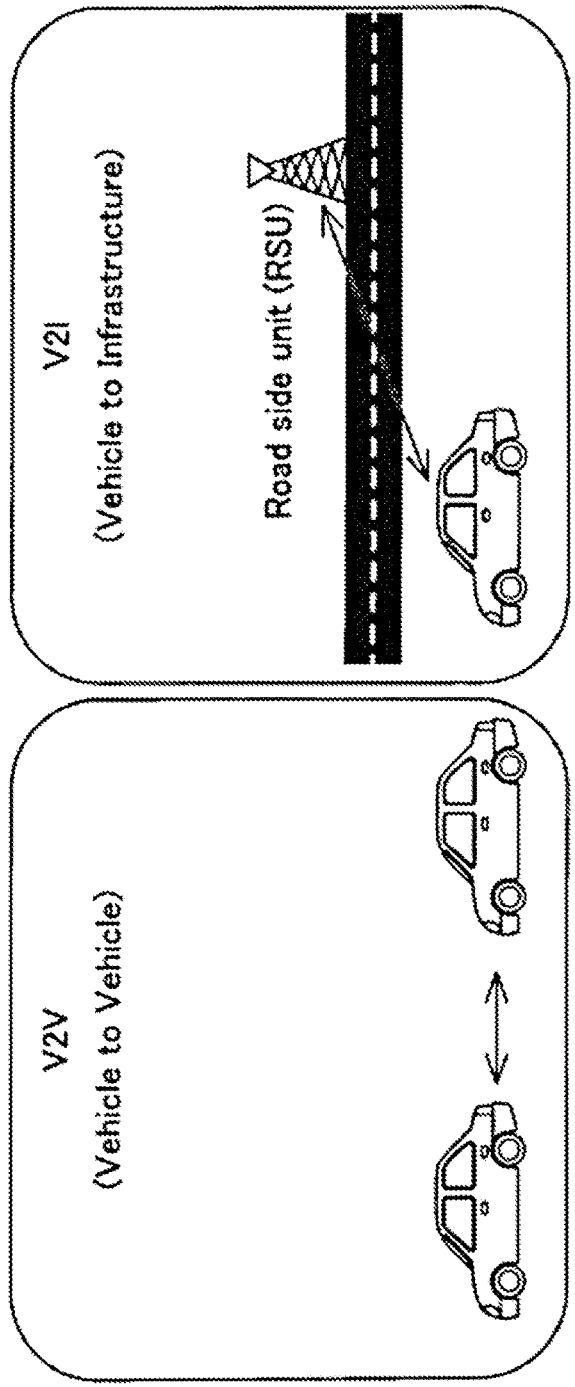
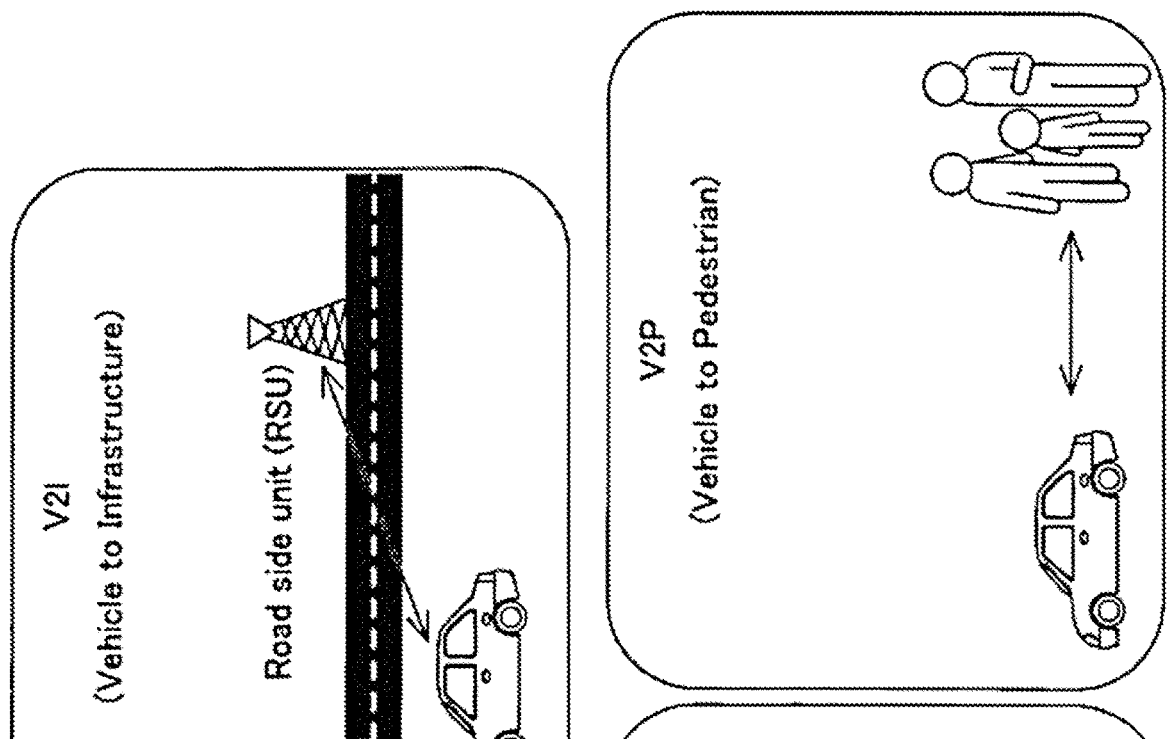
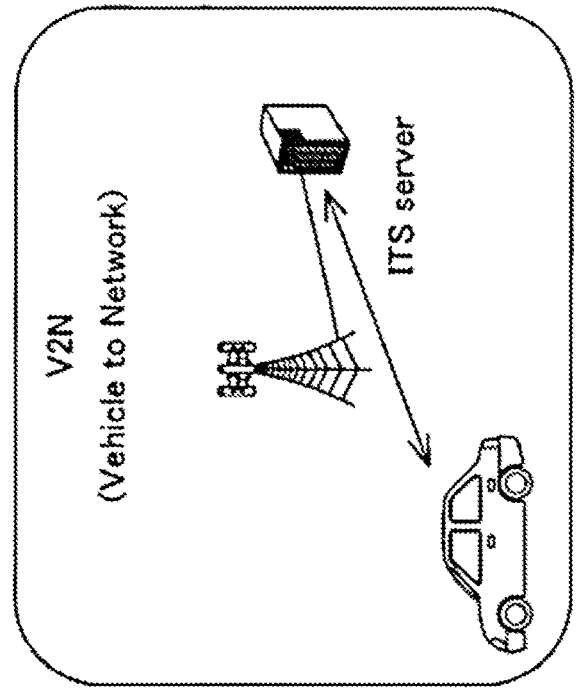
FIG.1

TERMINAL AND COMMUNICATION METHOD TO IMPLEMENT UNICAST COMMUNICATION SUITABLE FOR POWER SAVING OPERATION IN TERMINAL-TO-TERMINAL DIRECT COMMUNICATION

TECHNICAL FIELD

The present invention relates to a terminal and a communication method in a radio communication system.

BACKGROUND ART

In long term evolution (LTE) and the successor system of LTE (for example, LTE advanced (LTE-A) and new radio (NR) (also referred to as 5G)), device to device (D2D) technology has been discussed in which terminals perform direct communication with each other without using a base station (for example, Non-Patent Document 1).

D2D reduces traffic between the terminal and the base station, and enables communication between the terminals even when the base station is in a state where communication is not available during a disaster. Note that, in a 3rd generation partnership project (3GPP), D2D is referred to as a "sidelink", but herein, the more general term D2D is used. Here, in the description of the following embodiment, the sidelink is also used as necessary.

The D2D communication is classified broadly into D2D discovery for discovering other terminals that are capable of performing communication and D2D communication for performing direct communication between terminals (also referred to as D2D direct communication, terminal-to-terminal direct communication, and the like). Hereinafter, when the D2D communication, the D2D discovery, and the like are not particularly distinguished from each other, the D2D communication, the D2D discovery, and the like will be simply referred to as D2D. In addition, a signal to be transmitted and received in D2D will be referred to as a D2D signal. Various use cases of a service according to vehicle to everything (V2X) in NR have been discussed (for example, Non-Patent Document 2).

CITATION LIST

Non-Patent Document

Non-Patent Document 1: 3GPP TS 38.211 V16.2.0 (2020-06)
Non-Patent Document 2: 3GPP TR 22.886 V15.1.0 (2017-03)

SUMMARY OF THE INVENTION

Problem to be Solved by the Invention

As an enhancement of the NR sidelink, power saving is being discussed. It is assumed that a terminal (Power saving UE) that performs a power saving operation transmits and receives data only during a specific timing. On the other hand, in the unicast communication supported by the NR sidelink, an RRC (Radio resource control) connection is established in the interface PC5 defined between terminals, and communication is performed in a state in which the connection is maintained. For this reason, in a case where a terminal that performs a power-saving operation performs unicast communication, it is expected that the PC5-RRC connection will be frequently disconnected and that this will interfere with the communication.

The invention has been made in view of the above points, and it is an object of the invention to implement unicast communication suitable for power saving operation in terminal-to-terminal direct communication.

Means for Solving Problem

According to the disclosed technique, there is provided a terminal including: a control unit configured to connect to another terminal in an RRC (Radio Resource Control) layer; and a transmitting unit configured to transmit data to the another terminal. In a case where the another terminal or the terminal itself performs at least one of transmission, reception, and sensing during a specific timing, the control unit controls an operation related to the connection in the RRC layer, based on the specific timing.

Effect of the Invention

According to the disclosed technique, it is possible to implement unicast communication suitable for power saving operation in terminal-to-terminal direct communication.

BRIEF DESCRIPTION OF DRAWINGS

FIG. 1 is a diagram illustrating V2X.

MODE(S) FOR CARRYING OUT THE INVENTION

Figure 2:
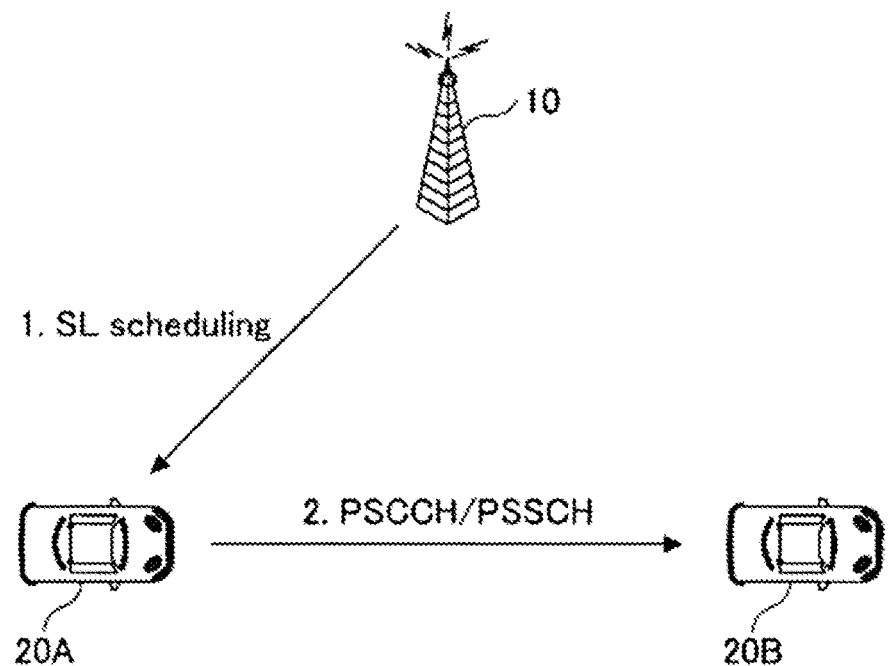
FIG. 2 is a diagram illustrating an example (1) of a transmission mode of V2X.

Hereinafter, an embodiment of the invention will be described with reference to the drawings. Note that, the embodiment described below is an example, and an embodiment to which the invention is applied is not limited to the following embodiment.

In the operation of a radio communication system of the embodiment of the invention, the conventional technology is suitably used. However, the conventional technology, for example, is the conventional LTE, but is not limited to the conventional LTE. In addition, the term "LTE" used herein has a broad meaning including LTE-advanced and a scheme subsequent to the LTE-advanced (for example, NR), or a wireless local area network (LAN), unless otherwise noted.

In addition, in the embodiment of the invention, a duplex may be a time division duplex (TDD), may be a frequency division duplex (FDD), or may be other schemes (for example, a flexible duplex or the like).

In addition, in the embodiment of the invention, "configuring" a radio parameter or the like may mean pre-configuring a predetermined value, or may be configuring a radio parameter that is indicated by a base station 10 or a terminal 20.

FIG. 1 is a diagram illustrating V2X. In 3GPP, it is discussed to implement vehicle to everything (V2X) or enhanced V2X (eV2X) by extending a D2D function, and the development of specifications thereof has progressed. As illustrated in FIG. 1, V2X is a part of intelligent transport systems (ITS), and is a generic term for: vehicle to vehicle (V2V) indicating a communication mode that is performed between vehicles; vehicle to infrastructure (V2I) indicating a communication mode that is performed between a vehicle and a road-side unit (RSU) to be provided on a roadside; vehicle to network (V2N) indicating a communication mode that is performed between a vehicle and an ITS server; and vehicle to pedestrian (V2P) indicating a communication mode that is performed between a vehicle and a mobile terminal carried by a pedestrian.

In addition, in 3GPP, V2X using cellular communication and terminal-to-terminal communication of LTE or NR have been discussed. V2X using the cellular communication is also referred to as cellular V2X. In V2X of NR, discussions have been held to achieve high capacity, low latency, high reliability, and quality of service (QoS) control.

Regarding V2X of LTE or NR, it is expected that discussions not limited to the 3GPP specification development will be held in the future. For example, it is expected that discussions will be held regarding: ensuring interoperability; reducing cost by implementing higher layers; a method for using together or switching a plurality of radio access technologies (RAT); regulation support in each country; data acquisition and delivering of a V2X platform of LTE or NR; and database management and a use method thereof.

In the embodiment of the invention, it is mainly expected that a communication device is mounted on a vehicle, but the embodiment of the invention is not limited thereto. For example, the communication device may be a terminal that is carried by a person, the communication device may be a device that is mounted on a drone or an aircraft, or the communication device may be a base station, RSU, a relay station (relay node), a terminal having scheduling capability, and the like.

Note that, a sidelink (SL) may be distinguished from an uplink (UL) or a downlink (DL), based on one of the following 1) to 4) or a combination thereof. In addition, SL may be referred to as another name.

1) Resource arrangement in the time domain
2) Resource arrangement in the frequency domain
3) A synchronization signal to be referred to (including sidelink synchronization signal (SLSS))
4) A reference signal to be used in path-loss measurement for transmission power control In addition, regarding orthogonal frequency division multiplexing (OFDM) of SL or UL, any of cyclic-prefix OFDM (CP-OFDM), Discrete Fourier Transform-Spread-OFDM (DFT-S-OFDM), OFDM without transform precoding, and OFDM with transform precoding may be applied.

In SL of LTE, regarding resource allocation of SL with respect to the terminal 20, Mode 3 and Mode 4 are defined. In Mode 3, a transmission resource is more dynamically allocated by downlink control information (DCI) that is transmitted from the base station 10 to the terminal 20. In addition, in Mode 3, semi persistent scheduling (SPS) can be performed. In Mode 4, the terminal 20 autonomously selects the transmission resource from a resource pool.

Note that, a slot in the embodiment of the invention may be replaced with a symbol, a mini slot, a subframe, a radio frame, and a transmission time interval (TTI). In addition, a cell in the embodiment of the invention may be replaced with a cell group, a carrier component, BWP, a resource pool, a resource, a radio access technology (RAT), a system (including a radio LAN), and the like.

Note that, in the embodiment of the invention, the terminal 20 is not limited to a V2X terminal, and may include all types of terminals that perform D2D communication. For example, the terminal 20 may be a terminal that is carried by a user, such as a smartphone, or may be an internet of things (IoT) device such as a smart meter.

FIG. 2 is a diagram illustrating Example (1) of a transmission mode of V2X. In the transmission mode of the sidelink communication illustrated in FIG. 2, in Step 1, the base station 10 transmits sidelink scheduling to a terminal 20A. Subsequently, the terminal 20A transmits a physical sidelink control channel (PSCCH) and a physical sidelink shared channel (PSSCH) to a terminal 20B, based on the received scheduling (Step 2). The transmission mode of the sidelink communication illustrated in FIG. 2 may be referred to as a sidelink transmission mode 3 in LTE. In the sidelink transmission mode 3 in LTE, Uu based sidelink scheduling is performed. Uu is a radio interface between a universal terrestrial radio access network (UTRAN) and a user equipment (UE). Note that, the transmission mode of the sidelink communication illustrated in FIG. 2 may be referred to as a sidelink transmission mode 1 in NR.

Figure 3:
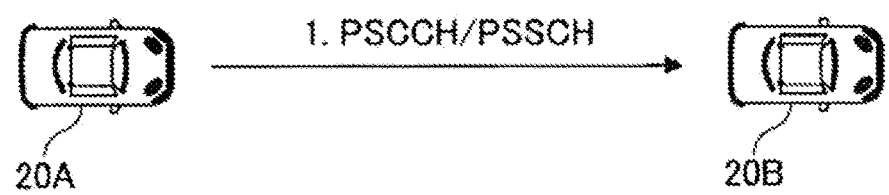
FIG. 3 is a diagram illustrating an example (2) of the transmission mode of V2X.

FIG. 3 is a diagram illustrating Example (2) of the transmission mode of V2X. In the transmission mode of the sidelink communication illustrated in FIG. 3, in Step 1, the terminal 20A transmits PSCCH and PSSCH to the terminal 20B by using the autonomously selected resource. The transmission mode of the sidelink communication illustrated in FIG. 3 may be referred to as a sidelink transmission mode 4 in LTE. In the sidelink transmission mode 4 in LTE, the UE itself executes resource selection.

Figure 4:
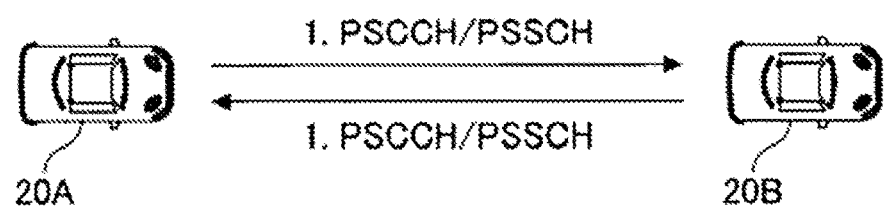
FIG. 4 is a diagram illustrating an example (3) of the transmission mode of V2X.

FIG. 4 is a diagram illustrating Example (3) of the transmission mode of V2X. In the transmission mode of the sidelink communication illustrated in FIG. 4, in Step 1, the terminal 20A transmits PSCCH and PSSCH to the terminal 20B by using the autonomously selected resource. Similarly, the terminal 20B transmits PSCCH and PSSCH to the terminal 20A by using the autonomously selected resource (Step 1). The transmission mode of the sidelink communication illustrated in FIG. 4 may be referred to as a sidelink transmission mode 2a in NR. In the sidelink transmission mode 2 in NR, the terminal 20 itself executes the resource selection.

Figure 5:
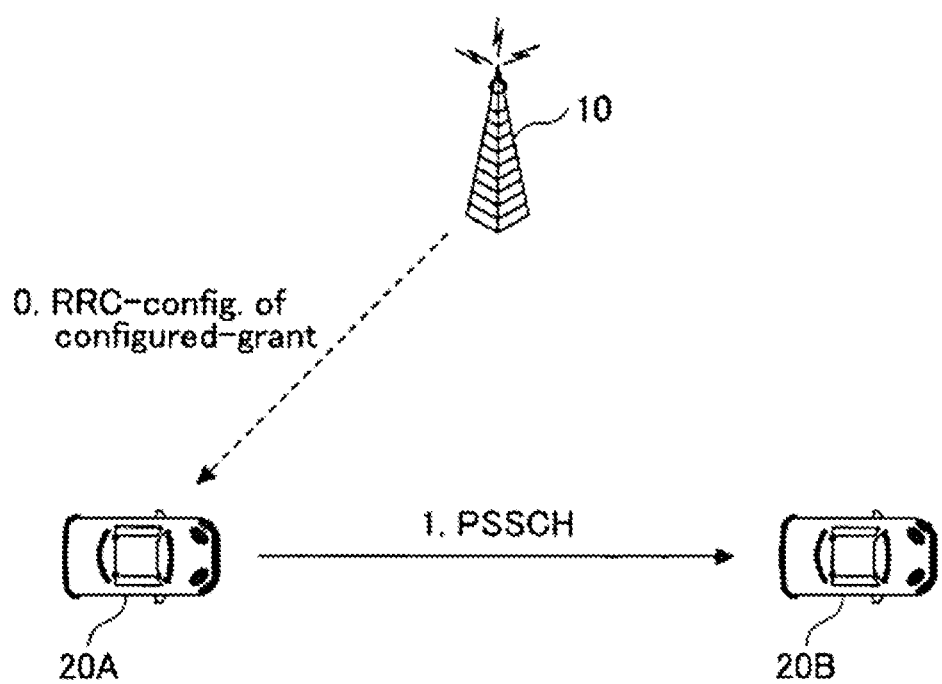
FIG. 5 is a diagram illustrating an example (4) of the transmission mode of V2X.

FIG. 5 is a diagram illustrating Example (4) of the transmission mode of V2X. In the transmission mode of the sidelink communication illustrated in FIG. 5, in Step 0, the base station 10 transmits the grant of the sidelink to the terminal 20A through radio resource control (RRC) configuration. Subsequently, the terminal 20A transmits PSSCH to the terminal 20B, based on the received resource pattern (Step 1). The transmission mode of the sidelink communication illustrated in FIG. 5 may be referred to as a sidelink transmission mode 2c in NR.

Figure 6:
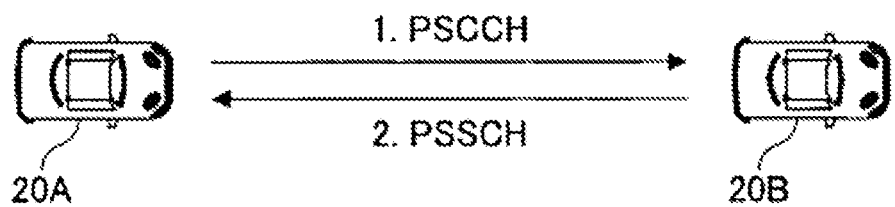
FIG. 6 is a diagram illustrating an example (5) of the transmission mode of V2X.

FIG. 6 is a diagram illustrating Example (5) of the transmission mode of V2X. In the transmission mode of the sidelink communication illustrated in FIG. 6, in Step 1, the terminal 20A transmits the sidelink scheduling to the terminal 20B through PSCCH. Subsequently, the terminal 20B transmits the PSSCH to the terminal 20A, based on the received scheduling (Step 2). The transmission mode of the sidelink communication illustrated in FIG. 6 may be referred to as a sidelink transmission mode 2d in NR.

Figure 7:
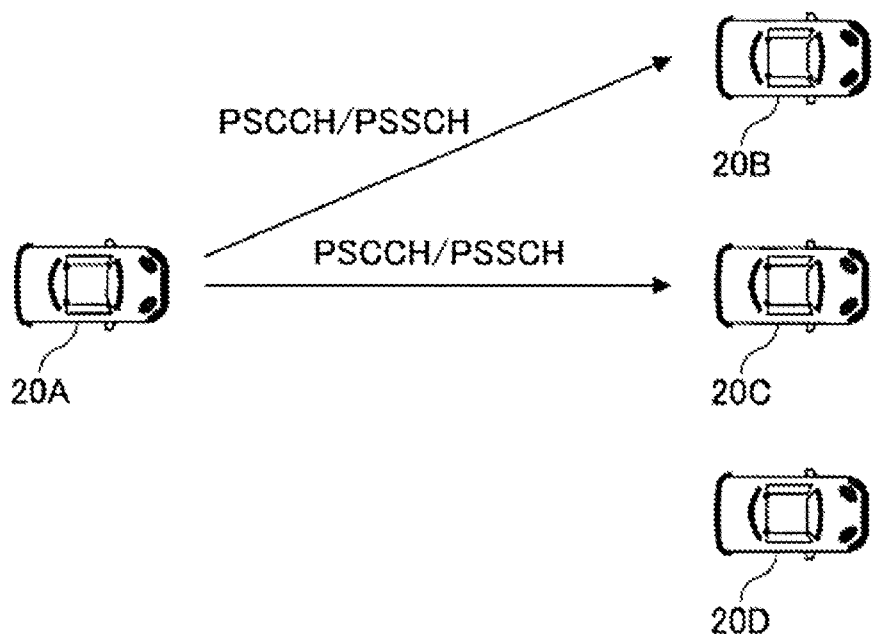
FIG. 7 is a diagram illustrating an example (1) of a communication type of V2X.

FIG. 7 is a diagram illustrating Example (1) of a communication type of V2X. The communication type of the sidelink illustrated in FIG. 7 is unicast. The terminal 20A transmits PSCCH and PSSCH to the terminal 20. In the example illustrated in FIG. 7, the terminal 20A performs unicast with respect to the terminal 20B, and performs unicast with respect to a terminal 20C.

Figure 8:
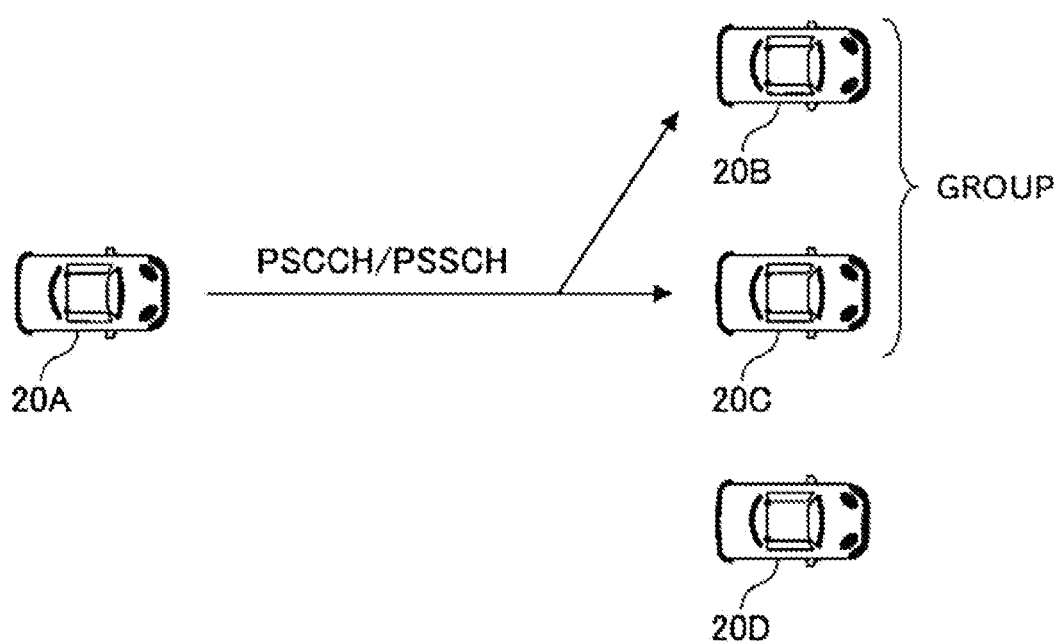
FIG. 8 is a diagram illustrating an example (2) of the communication type of V2X.

FIG. 8 is a diagram illustrating Example (2) of the communication type of V2X. The communication type of the sidelink illustrated in FIG. 8 is groupcast. The terminal 20A transmits PSCCH and PSSCH to a group to which one or a plurality of terminals 20 belong. In the example illustrated in FIG. 8, the group includes the terminal 20B and the terminal 20C, and the terminal 20A performs groupcast with respect to the group.

Figure 9:
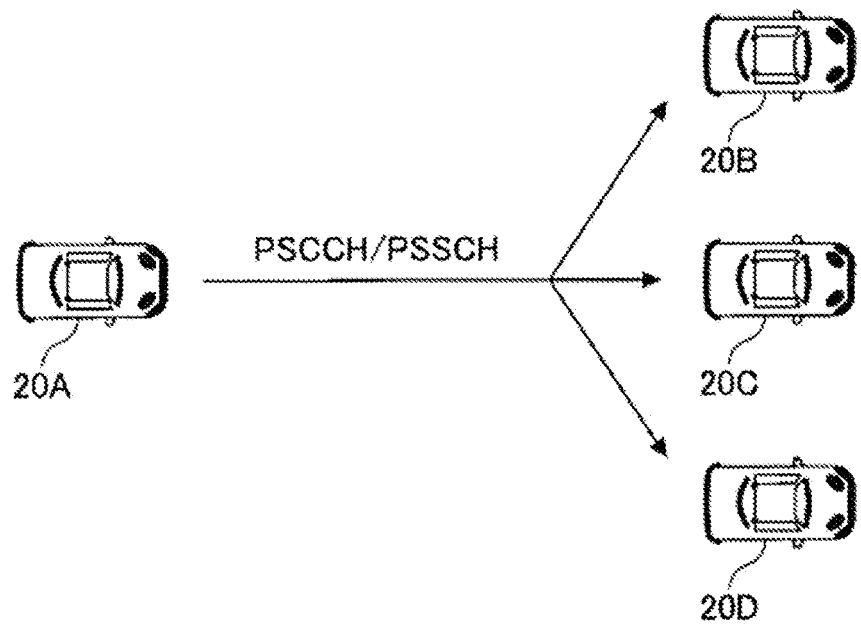
FIG. 9 is a diagram illustrating an example (3) of the communication type of V2X.

FIG. 9 is a diagram illustrating Example (3) of the communication type of V2X. The communication type of the sidelink illustrated in FIG. 9 is broadcast. The terminal 20A transmits PSCCH and PSSCH to one or a plurality of terminals 20. In the example illustrated in FIG. 9, the terminal 20A performs broadcast with respect to the terminal 20B, the terminal 20C, and a terminal 20D. Note that, the terminal 20A illustrated in FIG. 7 to FIG. 9 may be referred to as a header-UE.

In addition, in NR-V2X, it is expected that a hybrid automatic repeat request (HARQ) is supported by the unicast and the groupcast of the sidelink. Further, in NR-V2X, sidelink feedback control information (SFCI) including a HARQ response is defined. Further, it is discussed that SFCI is transmitted through a physical sidelink feedback channel (PSFCH).

Note that, in the following description, in the transmission of HARQ-ACK in the sidelink, PSFCH is used, which is an example. For example, the transmission of HARQ-ACK in the sidelink may be performed by using PSCCH, the transmission of HARQ-ACK in the sidelink may be performed by using PSSCH, or the transmission of HARQ-ACK in the sidelink may be performed by using another channel.

Hereinafter, for convenience sake, the overall information that is reported by the terminal 20 in HARQ will be referred to as HARQ-ACK. Such HARQ-ACK may be referred to as HARQ-ACK information. In addition, more specifically, a codebook to be applied to the HARQ-ACK information that is reported to the base station 10 and the like from the terminal 20 will be referred to as a HARQ-ACK codebook. The HARQ-ACK codebook defines a bit sequence of the HARQ-ACK information. Note that, not only ACK but also NACK are transmitted by "HARQ-ACK".

Figure 10:
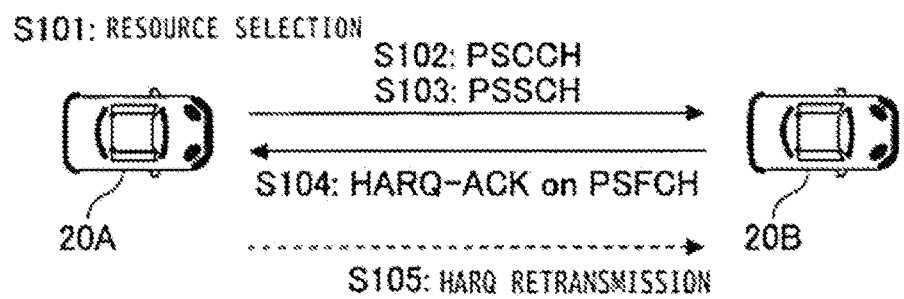
FIG. 10 is a sequence diagram illustrating an Operation Example (1) of V2X.

FIG. 10 is a sequence diagram illustrating Operation Example (1) of V2X. As illustrated in FIG. 10, the radio communication system according to the embodiment of the invention may include the terminal 20A and the terminal 20B. Note that, in practice, there are a plurality of user equipments, and, as the example of FIG. 10, the terminal 20A and the terminal 20B are illustrated.

Hereinafter, when the terminals 20A and 20B, and the like are not particularly distinguished from each other, the terminals 20A and 20B, and the like will be simply described as the "terminal 20" or the "user equipment". In FIG. 10, as an example, a case where both the terminal 20A and the terminal 20B are within the coverage of the cell is illustrated, but the operation of the embodiment of the invention can also be applied to a case where the terminal 20B is out of the coverage.

As described above, in this embodiment, the terminal 20, for example, is a device mounted on a vehicle such as an automobile, and has a cellular communication function and a sidelink function as UE in LTE or NR. The terminal 20 may be a typical portable terminal (a smartphone and the like). In addition, the terminal 20 may be RSU. RSU described above may be UE type RSU having the function of UE, or may be gNB type RSU having the function of a base station device.

Note that, it is not necessary that the terminal 20 is to be a device with one housing, and for example, even in a case where various sensors are dispersedly arranged in a vehicle, a device including the various sensors may be the terminal 20.

In addition, processing details of the transmission data of the sidelink of the terminal 20 are basically identical to processing details of UL transmission in LTE or NR. For example, the terminal 20 scrambles and modulates a codeword of transmission data to generate complex-valued symbols, maps the complex-valued symbols (transmission signals) to one or two layers, and performs precoding. Then, the terminal 20 maps the precoded complex-valued symbols to a resource element to generate a transmission signal (Example: a complex-valued time-domain SC-FDMA signal), and transmits the transmission signal from each antenna port.

Note that, the base station 10 has a cellular communication function as a base station in LTE or NR, and a function of enabling the communication of the terminal 20 in this embodiment (Example: resource pool configuration, resource allocation, and the like). In addition, the base station 10 may be RSU (gNB type RSU).

In addition, in the radio communication system according to the embodiment of the invention, a signal waveform that is used by the terminal 20 in SL or UL may be OFDMA, may be SC-FDMA, or may be other signal waveforms.

In step S101, the terminal 20A autonomously selects a resource to be used for the PSCCH and the PSSCH from a resource selection window having a predetermined period. The resource selection window may be configured by the base station 10 for the terminal 20.

In Step S102 and Step S103, the terminal 20A transmits sidelink control information (SCI) via PSCCH and/or PSSCH, and transmits SL data via PSSCH, using the resource autonomously selected in Step S101. For example, the terminal 20A may transmit PSCCH with a time resource that is same as at least a part of the time resource of PSSCH, by using a frequency resource adjacent to a frequency resource of PSSCH.

The terminal 20B receives SCI (PSCCH and/or PSSCH) and the SL data (PSSCH) transmitted from the terminal 20A. The received SCI may include the information of the resource of PSFCH for the terminal 20B to transmit HARQ-ACK in response to the reception of the data. The terminal 20A may include the information of the autonomously selected resource in SCI to transmit the information.

In Step S104, the terminal 20B transmits HARQ-ACK corresponding to the received data to the terminal 20A by using the resource of PSFCH determined from the received SCI.

In Step S105, in a case where HARQ-ACK received in Step S104 indicates that retransmission is requested, that is, in a case where it is a negative response (NACK), the terminal 20A retransmits PSCCH and PSSCH to the terminal 20B. The terminal 20A may retransmit PSCCH and PSSCH by using the autonomously selected resource.

Note that, in a case where HARQ control is not executed, Step S104 and Step S105 need not be executed.

Figure 11:
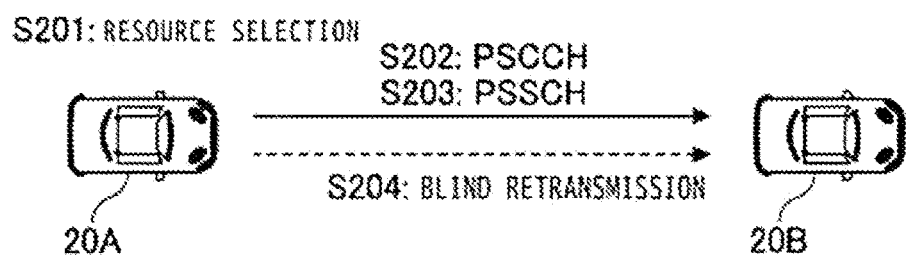
FIG. 11 is a sequence diagram illustrating an Operation Example (2) of V2X.

FIG. 11 is a sequence diagram illustrating Operation Example (2) of V2X. Blind retransmission, which is not based on the HARQ control, for improving a success rate or a reaching distance of the transmission may be executed.

In Step S201, the terminal 20A autonomously selects the resource that is to be used for PSCCH and PSSCH from the resource selection window having a predetermined period. The resource selection window may be configured in the terminal 20 by the base station 10.

In Step S202 and Step S203, the terminal 20A transmits SCI via PSCCH and/or PSSCH, and transmits the SL data via PSSCH, using the resource autonomously selected in Step S201. For example, the terminal 20A may transmit PSCCH with a time resource that is same as at least a part of the time resource of PSSCH, using a frequency resource adjacent to the frequency resource of PSSCH.

In Step S204, the terminal 20A retransmits SCI via PSCCH and/or PSSCH and the SL data via PSSCH to the terminal 20B by using the resource autonomously selected in Step S201. The retransmission in Step S204 may be executed a plurality of times.

Note that, in a case where the blind retransmission is not executed, Step S204 need not be executed.

Figure 12:
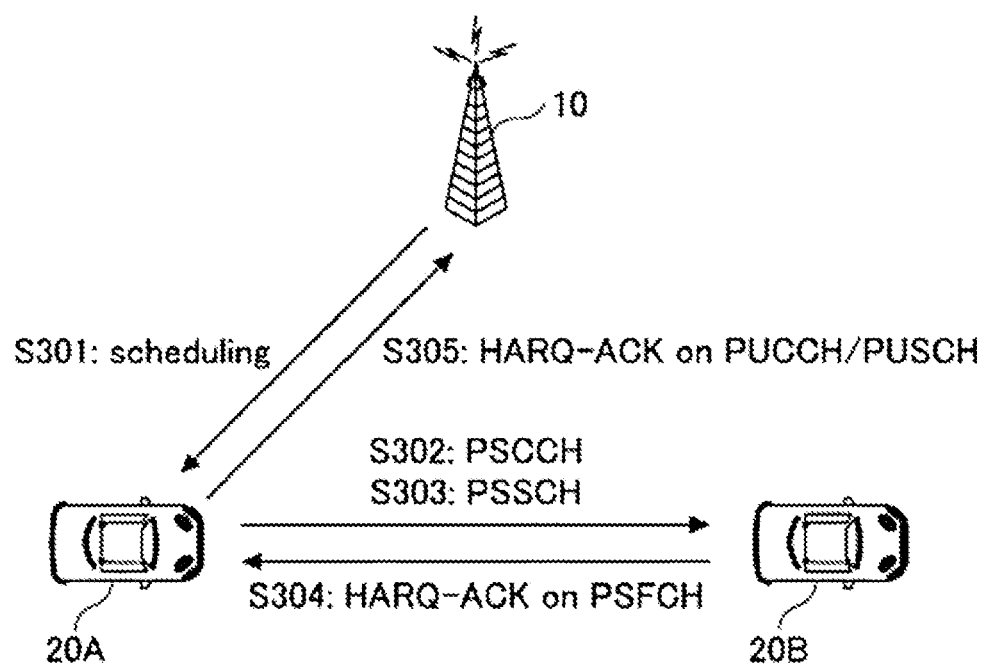
FIG. 12 is a sequence diagram illustrating an Operation Example (3) of V2X.

FIG. 12 is a sequence diagram illustrating Operation Example (3) of V2X. The base station 10 may perform the sidelink scheduling. That is, the base station 10 may determine a resource of the sidelink that is used by the terminal 20, and may transmit information indicating the resource to the terminal 20. Further, in a case where the HARQ control is applied, the base station 10 may transmit information indicating the resource of PSFCH to the terminal 20.

In Step S301, the base station 10 sends downlink control information (DCI) to the terminal 20A via PDCCH, thereby performing the SL scheduling. Hereinafter, for convenience sake, DCI for SL scheduling will be referred to as SL scheduling DCI.

In addition, in Step S301, it is expected that the base station 10 also transmits DCI for DL scheduling (may be referred to as DL allocation) to the terminal 20A via PDCCH. Hereinafter, for convenience sake, DCI for DL scheduling will be referred to as DL scheduling DCI. The terminal 20A that has received DL scheduling DCI receives DL data via PDSCH, using a resource that is specified by DL scheduling DCI.

In Step S302 and Step S303, the terminal 20A transmits the sidelink control information (SCI) via PSCCH and/or PSSCH, and transmits the SL data via PSSCH, using the resource specified by SL scheduling DCI. Note that, in SL scheduling DCI, the resource of PSSCH alone may be specified. In this case, for example, the terminal 20A may transmit PSCCH with a time resource that is same as at least a part of the time resource of PSSCH, using a frequency resource adjacent to the frequency resource of PSSCH.

The terminal 20B receives SCI (PSCCH and/or PSSCH) and the SL data (PSSCH) transmitted from the terminal 20A. SCI received via PSCCH and/or PSSCH includes information of the resource of PSFCH for the terminal 20B to transmit HARQ-ACK corresponding to the reception of the data.

The information of the resource is included in DL scheduling DCI or SL scheduling DCI that is transmitted from the base station 10 in Step S301, and the terminal 20A acquires the information of the resource from the DL scheduling DCI or the SL scheduling DCI and includes the information in SCI. Alternatively, DCI to be transmitted from the base station 10 need not include the information of the resource, and the terminal 20A may autonomously include the information of the resource in SCI to transmit the information.

In Step S304, the terminal 20B transmits HARQ-ACK corresponding to the received data to the terminal 20A by using the resource of PSFCH determined from the received SCI.

In Step S305, the terminal 20A, for example, transmits HARQ-ACK by using a resource of a physical uplink control channel (PUCCH) specified by DL scheduling DCI (or SL scheduling DCI), and the base station 10 receives HARQ-ACK, during a timing specified by DL scheduling DCI (or SL scheduling DCI) (for example, a timing in unit of slots) In the HARQ-ACK codebook, ARQ-ACK that is generated based on HARQ-ACK that is received from the terminal 20B or based on PSFCH that is not received from the terminal 20B, and HARQ-ACK corresponding to the DL data can be included.

Here, in a case where there is no allocation of the DL data, HARQ-ACK corresponding to the DL data is not included. In NR Rel.16, in the HARQ-ACK codebook, HARQ-ACK corresponding to the DL data is not included.

Note that, in a case where the HARQ control is not executed, Step S304 and Step S305 need not be executed.

Figure 13:
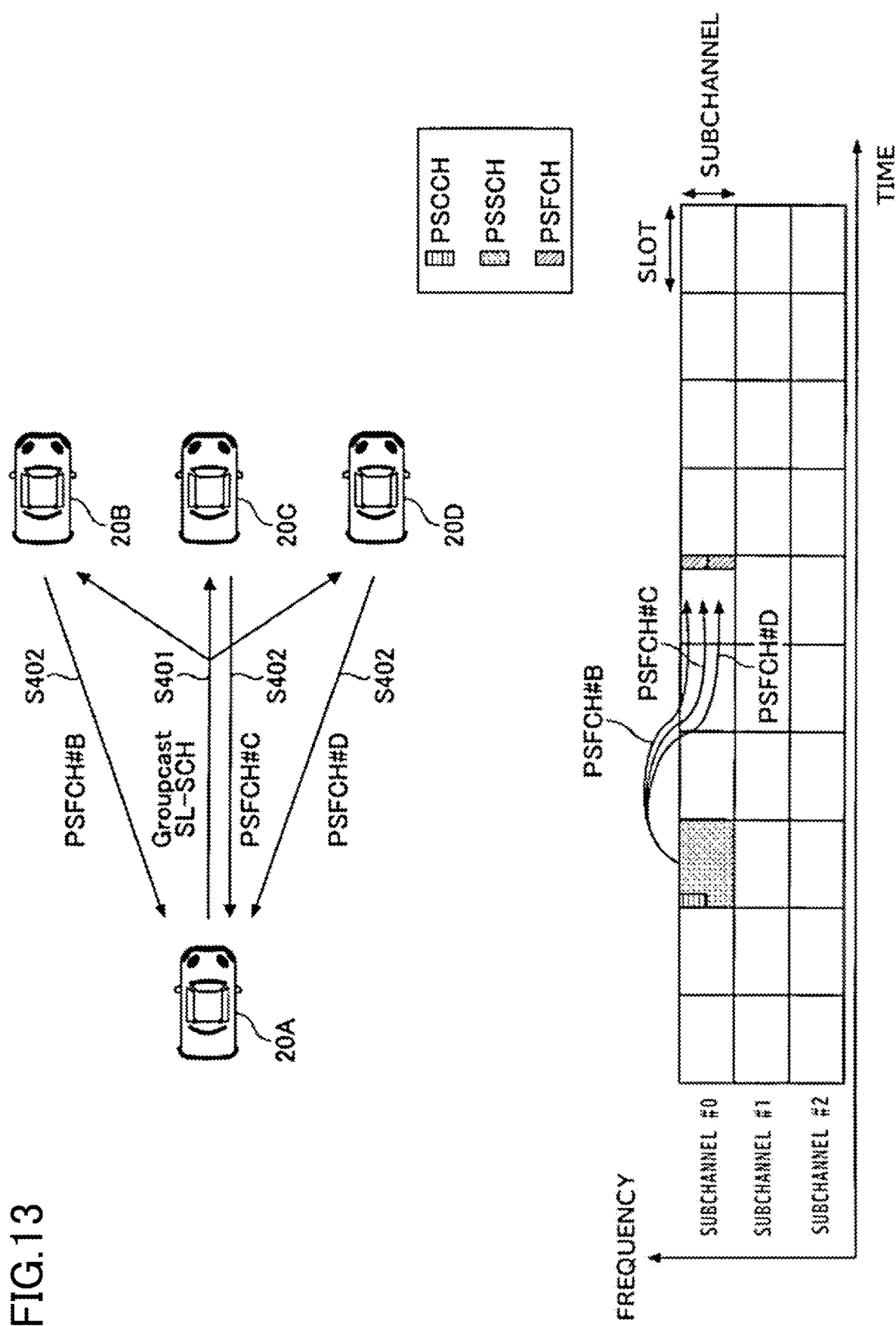
FIG. 13 is a sequence diagram illustrating an Operation Example (4) of V2X.

FIG. 13 is a sequence diagram illustrating Operation Example (4) of V2X. As described above, in the sidelink of NR, it is supported that the HARQ response is to be transmitted via PSFCH. Note that, as the format of PSFCH, for example, the same format as a physical uplink control channel (PUCCH) format 0 can be used. That is, the format of PSFCH may be a sequence-based format in which a physical resource block (PRB) size is 1, and ACK and NACK are identified by a difference in a sequence and/or a cyclic shift. The format of PSFCH is not limited thereto. The resource of PSFCH may be arranged in a symbol at the end of the slot or in a plurality of symbols at the end of the slot. In addition, whether or not a period N is configured for the PSFCH resource is defined in advance. The period N may be configured in unit of slots, or may be defined in advance.

In FIG. 13, the vertical axis corresponds to the frequency domain, and the horizontal axis corresponds to the time domain. PSCCH may be arranged in one symbol at the head of the slot, may be arranged in a plurality of symbols from the head of the slot, or may be arranged in a plurality of symbols from a symbol that is not at the head of the slot. PSFCH may be arranged in one symbol at the end of the slot, or may be arranged in a plurality of symbols at the end of the slot. In the example illustrated in FIG. 13, three subchannels are configured in the resource pool, and two PSFCHs are arranged in the third slot after a slot in which PSSCH is arranged. An arrow to PSFCH from PSSCH indicates an example of PSFCH that is associated with PSSCH.

In a case where the HARQ response in the groupcast of NR-V2X is a groupcast option 2 for transmitting ACK or NACK, it is necessary to determine a resource that is used in the transmission and reception of PSFCH. As illustrated in FIG. 13, in Step S401, the terminal 20A, which is a transmission-side terminal 20, performs groupcast with respect to the terminal 20B, the terminal 20C, and the terminal 20D, which are reception-side terminals 20, via SL-SCH. Subsequently, in Step S402, the terminal 20B uses PSFCH #B, the terminal 20C uses PSFCH #C, and the terminal 20D uses PSFCH #D to transmit the HARQ response to the terminal 20A. Here, as illustrated in the example of FIG. 13, in a case where the number of available resources of PSFCH is less than the number of reception-side terminals 20 belonging to the group, it is necessary to determine how to allocate the resources of PSFCH. Note that, the transmission-side terminal 20 may have the number of reception-side terminals 20 in the groupcast. Note that, in a groupcast option 1, only NACK is transmitted as the HARQ response, and thus ACK is not transmitted.

Figure 14:
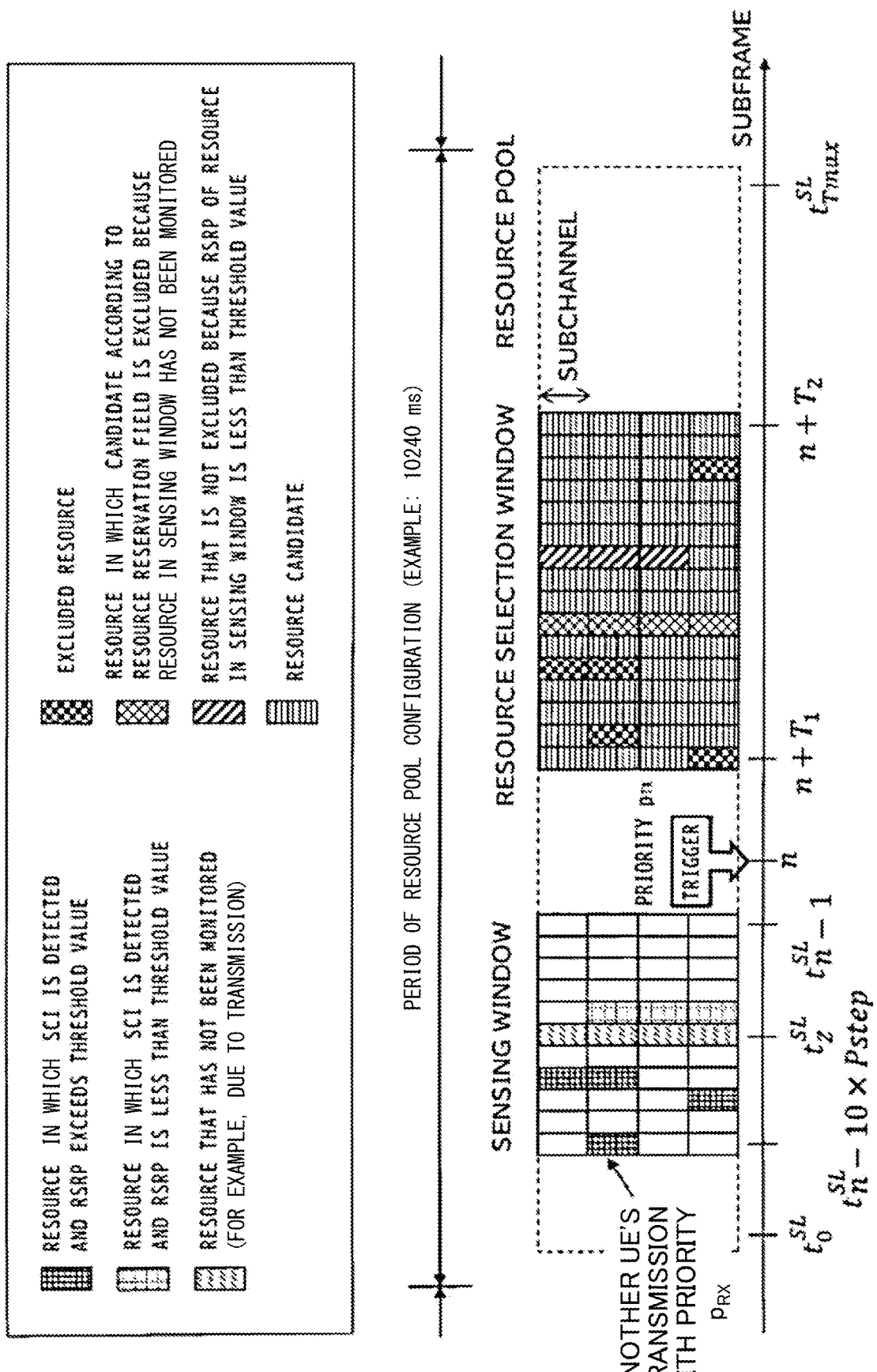
FIG. 14 is a diagram illustrating an example of a sensing operation.

FIG. 14 is a diagram illustrating an example of a sensing operation. In a case where partial sensing is not configured by a higher layer in an LTE sidelink, as illustrated in FIG. 14, the terminal 20 performs transmission by selecting a resource. As illustrated in FIG. 14, the terminal 20 executes sensing in a sensing window in the resource pool. By executing the sensing, the terminal 20 receives a resource reservation field that is included in SCI to be transmitted from another terminal 20, and identifies available resource candidates in the resource selection window in the resource pool, based on the field. Subsequently, the terminal 20 randomly selects a resource from the available resource candidates. Sensing all the resources in the sensing window may be referred to as full sensing.

In addition, as illustrated in FIG. 14, the configuration of the resource pool may have a period. For example, the period may be a period of 10,240 milliseconds. FIG. 14 is an example in which subframes from a subframe $t_0^{SL}$ to a subframe $t_{Tmax}^{SL}$ are configured as the resource pool. The domain of the resource pool in the period may be configured by a bitmap, for example.

In addition, as illustrated in FIG. 14, a transmission trigger in the terminal 20 occurs in a subframe n, and the transmission priority is $p_{TX}$. The terminal 20, for example, is capable of detecting that another terminal 20 performs transmission with a priority $p_{RX}$, in the sensing window from a subframe $t_{n-10 \times Pstep}^{SL}$ to a subframe $t_{n-1}^{SL}$. In a case where SCI is detected in the sensing window, and an RSRP is greater than a threshold value, the resource in the resource selection window corresponding to the SCI is excluded. In addition, in a case where SCI is detected in the sensing window, and RSRP is less than the threshold value, the resource in the resource selection window corresponding to the SCI is not excluded. The threshold value, for example, may be a threshold value $Th_{pTX, pRX}$ to be configured or defined for each resource in the sensing window, based on the priority $p_{TX}$ and the priority $p_{RX}$.

In addition, as with a subframe $t_z^{SL}$ illustrated in FIG. 14, a resource in the resource selection window to be a candidate of resource reservation information corresponding to a resource that has not been monitored, for example, due to transmission, in the sensing window, is excluded.

As illustrated in FIG. 14, in the resource selection window from a subframe $n+T_1$ to a subframe $n+T_2$, a resource occupied by another UE is identified, and resources excluding the resource are the available resource candidates. In a case where a set of available resource candidates is denoted as $S_A$, and $S_A$ is less than 20% of the resources in the resource selection window, the threshold value $Th_{pTX, pRX}$ that is configured for each resource in the sensing window may be increased by 3 dB, and the identification of the resource may be executed again. That is, the threshold value $Th_{pTX, pRX}$ is increased, and the identification of the resource is executed again, and thus, the resources that are not excluded because of RSRP being less than the threshold value may be increased. Further, a RSSI of each of the resources of $S_A$ may be measured, and a resource with the minimum RSSI may be added to a set $S_B$. An operation of adding the resource with the minimum RSSI included in $S_A$ to $S_B$ may be repeated until the set of resource candidates $S_B$ becomes greater than or equal to 20% of the resource selection window.

A lower layer of the terminal 20 may report $S_B$ to a higher layer. The higher layer of the terminal 20 may determine a resource to be used, by executing random selection with respect to $S_B$. The terminal 20 may execute sidelink transmission by using the determined resource. Note that, after ensuring the resources, the terminal 20 may periodically use the resources without performing the sensing a predetermined number of times (for example, $C_{resel}$ times).

Figure 15:
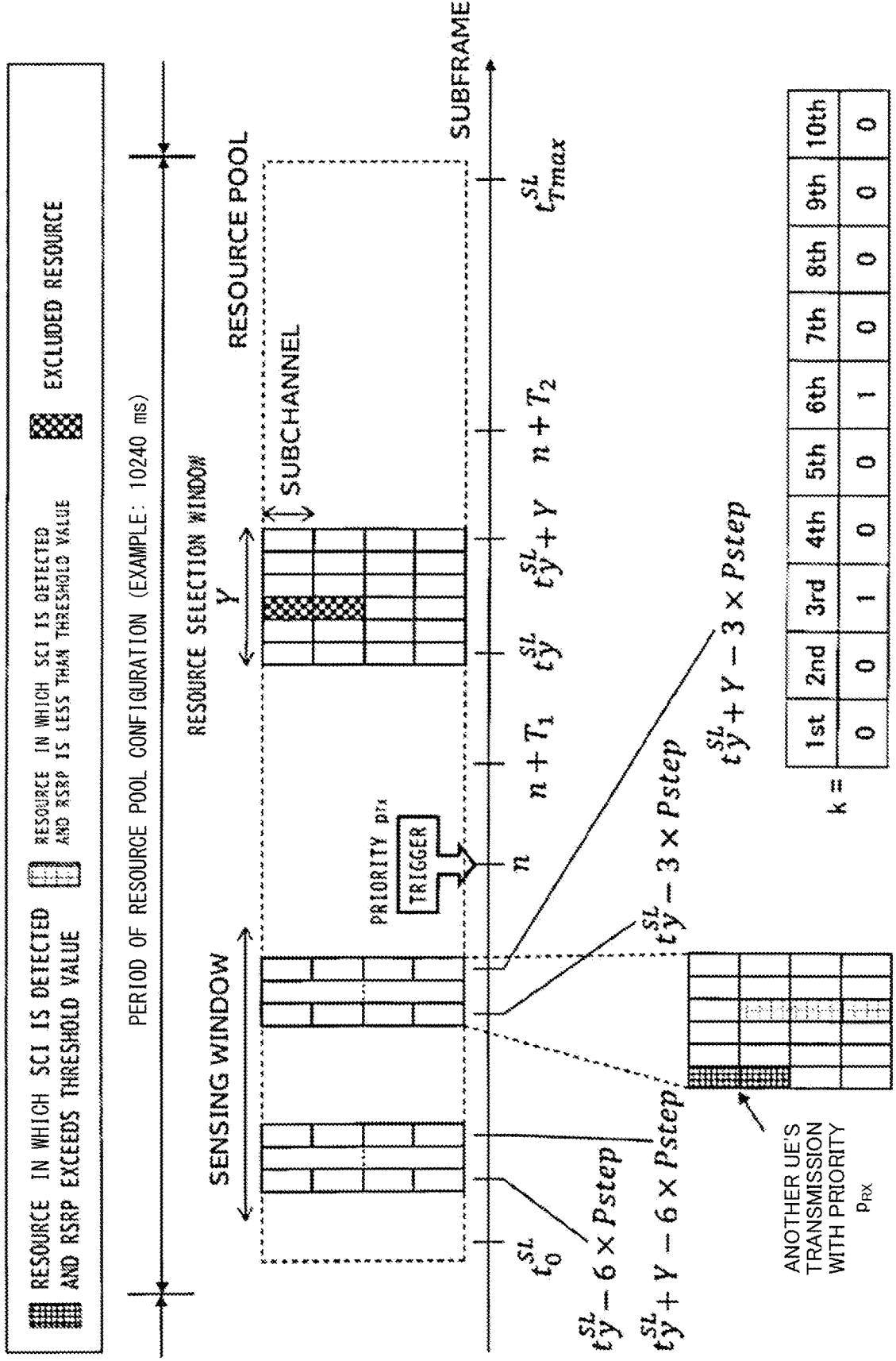
FIG. 15 is a diagram illustrating an example of a partial sensing operation.

FIG. 15 is a diagram illustrating an example of a partial sensing operation. In a case where the partial sensing is configured by the higher layer in the LTE sidelink, the terminal 20 performs transmission by selecting a resource as illustrated in FIG. 15. As illustrated in FIG. 15, the terminal 20 executes the partial sensing with respect to a part of the sensing window in the resource pool. By executing the partial sensing, the terminal 20 receives a resource reservation field that is included in SCI to be transmitted from another terminal 20, and identifies the available resource candidates in the resource selection window in the resource pool, based on the field. Subsequently, the terminal 20 randomly selects a resource from the available resource candidates.

In addition, as illustrated in FIG. 15, the configuration of the resource pool may have a period. For example, the period may be a period of 10,240 milliseconds. FIG. 15 is an example in which subframes from the subframe $t_0^{SL}$ to the subframe $t_{Tmax}^{SL}$ are configured as the resource pool. The domain of the resource pool in the period may be configured by a bitmap, for example.

As shown in FIG. 15, it is assumed that a transmission trigger in the terminal 20 is generated in the subframe n and the priority of the transmission is $p_{TX}$. As shown in FIG. 15, among the subframes $n+T_1$ to $n+T_2$, Y subframes from the subframe $t_y^{SL}$ to the subframe $t_{y+Y}^{SL}$ may be configured as a resource selection window. In addition, as shown in FIG. 15, it is assumed that a transmission trigger in the terminal 20 is generated in the subframe n and the priority of the transmission is $p_{TX}$.

The terminal 20 can detect, for example, that another terminal 20 is performing transmission with the priority $p_{RX}$ in one or more sensing windows having a Y subframe length from the subframe $t_{y-k\times Pstep}^{SL}$ to the subframe $t_{y+Y-k\times Pstep}^{SL}$. k may be, for example, a 10-bit bitmap. FIG. 15 shows an example in which the third and sixth bits of the bitmap k are configured to "1" indicating that partial sensing is to be performed. That is, in FIG. 15, subframes from $t_{y-6\times Pstep}^{SL}$ to $t_{y+Y-6\times Pstep}^{SL}$ and subframes from $t_{y-3\times Pstep}^{SL}$ to $t_{y+Y-3\times Pstep}^{SL}$ are configured as a sensing window. As described above, the i-th bit of the bitmap k may correspond to a sensing window from the subframe $t_{y-i\times Pstep}^{SL}$ to the subframe $t_{y+Y-i\times Pstep}^{SL}$.

In a case where the SCI is detected in the one or more sensing windows and the RSRP exceeds the threshold value, the resources in the resource selection window corresponding to the SCI are excluded. In addition, in a case where the SCI is detected in the sensing window and the RSRP is less than the threshold value, the resources in the resource selection window corresponding to the SCI are not excluded. The threshold value may be, for example, a threshold value $Th_{pTX, pRX}$ configured or defined for each resource in the sensing window based on the priority $p_{TX}$ and the priority $p_{RX}$.

In the resource selection window in which the Y subframes are configured, the terminal 20 identifies resources occupied by another UE, and resources excluding the resources become available resource candidates. Assuming that the set of available resource candidates is $S_A$, in a case where $S_A$ is less than 20% of the resources in the resource selection window, the threshold value $Th_{pTX, pRX}$ configured for each resource in the sensing window may be increased by 3 dB and resource identification may be performed again. That is, by increasing the threshold value $Th_{pTX, pRX}$ and performing the resource identification again, resources that are not excluded because the RSRP is less than the threshold value may be increased. In addition, the RSSI of each resource of $S_A$ may be measured, and a resource having a smallest RSSI may be added to a set $S_B$. The operation of adding a resource having a smallest RSSI included in $S_A$ to $S_B$ may be repeated until the set $S_B$ of the resource candidates becomes greater than or equal to 20% of the resource selection window.

The lower layer of the terminal 20 may report $S_B$ to the upper layer. The upper layer of the terminal 20 performs random selection with respect to $S_B$ to determine the resources to be used. The terminal 20 may perform sidelink transmission by using the determined resources. Note that, once the resources are secured, thereafter, the terminal 20 may use the resources periodically without performing sensing a predetermined number of times (for example, $C_{resel}$ times).

Although the operation of the transmission-side terminal 20 has been described with reference to FIGS. 14 and 15 described above, the reception-side terminal 20 may detect data transmission from another terminal 20 based on the result of sensing or partial sensing and may receive the data from the another terminal 20.

In the NR release 17 sidelink, power saving based on the above-described random resource selection and partial sensing is being discussed. For example, in order to save power, the random resource selection and partial sensing of the sidelink in LTE release 14 may be applied to the resource allocation mode 2 of the NR release 16 sidelink. The terminal 20 to which the partial sensing is applied performs reception and sensing only in a specific slot in the sensing window.

In addition, in the NR release 17 sidelink, enhanced ultra reliable low latency communication (eURLLC) is being discussed by using terminal-to-terminal coordination (inter-UE coordination) as a base line. For example, the terminal 20A may share information indicating a resource set with the terminal 20B, and the terminal 20B may consider the information in the resource selection for transmission.

On the other hand, in NR release 16, unicast communication is adopted. PC5-RRC connection is made between terminals, and unicast communication is performed while maintaining the RRC connection. For example, the operation related to the sidelink RRC connection is defined as follows.

1) Sidelink RRC Reconfiguration

The PC5-RRC connection is established/modified by the transmission or reception of an "RRCReconfigurationSidelink" message and the reception or reception of an "RRCReconfigurationCompleteSidelink" message.

2) Sidelink UE Capability Transfer

The UE capability related to the sidelink is indicated by the transmission or reception of "UECapabilityEnquirySidelink" and the reception or transmission of "UECapabilityInformationSidelink".

3) Operation at the Time of Sidelink Radio Link Failure

For example, in a case where the maximum number of retransmissions is reached, in a case where the timer (T400) expires or in a case where the number of consecutive HARQ-DTX times reaches the maximum number of times, or in a case where the PDCP entity of the sidelink fails the integrity check, it is determined that PC5-RRC connection failure has been detected. The timer T400 is started when the "RRCReconfigurationSidelink" is transmitted, and is stopped when the "RRCReconfigurationFailureSidelink" or the "RRCReconfigurationCompleteSidelink" is received. In addition, for example, when the timer T400 expires, a Sidelink RRC reconfiguration failure procedure is performed.

4) Sidelink Measurement

The terminal 20 may configure, to the facing terminal 20, the NR sidelink measurement and the report through the corresponding PC5-RRC connection via the "RRCReconfigurationSidelink" message.

Here, the terminal 20 (power saving UE) that performs a power saving operation may perform data reception and/or data transmission only in a limited period. Therefore, it is expected that the PC5-RRC connection cannot be maintained and is disconnected, and that this will interfere with the unicast communication. It is necessary to change the mechanism of PC5-RRC connection so that the terminal 20 that performs a power saving operation can also perform unicast communication.

Therefore, for example, in a case where the terminal 20A and the terminal 20B are connected to each other by the RRC layer in the sidelink, when at least one of the terminal 20A and the terminal 20B performs at least one of transmission, reception, and sensing operations only during a specific timing, the operation related to the connection of the RRC layer may be an operation based on the specific timing. In addition, the timing may refer to, for example, one or more periodic slots or symbols, or may refer to an arbitrary section in another time domain unit. In addition, the specific timing may refer to one or more aperiodic slots or symbols. In addition, the specific timing may be a timing in which an offset is applied to one or more periodic slots or symbols.

For example, in a case where at least one of the following conditions 1) to 5) is satisfied, the above-described operation based on the specific timing may be applied.

1) In a case where both the terminal 20A and the terminal 20B perform at least one of the transmission, reception, and sensing operations only during a specific timing.

2) In a case where either the terminal 20A or the terminal 20B performs at least one of the transmission, reception, and sensing operations only during a specific timing.

3) In a case where one of the terminal 20A and the terminal 20B performs at least one of the transmission, reception, and sensing operations only during a specific timing and the other one can perform the above-described operation based on the specific timing. The UE capability of performing the operation may be or need not be indicated to another terminal 20.

4) In a case where one of the terminal 20A and the terminal 20B instructs the other one to perform the above-described operation during the specific timing.

5) In a case where one of the terminal 20A and the terminal 20B indicates, to the other, that the above-described operation during the specific timing can be performed. The indication may be "UECapabilityEnquirySidelink" or may be an indication by another message.

In addition, for example, the above-described operation based on the specific timing may be applied to any one of the following 1) to 3).

1) Both the terminal 20A and the terminal 20B

2) Of the terminal 20A and the terminal 20B, the terminal 20 capable of performing the above-described operation during the specific timing 3) Of the terminal 20A and the terminal 20B, the terminal 20 instructed to perform the above-described operation during the specific timing.

Figure 16:
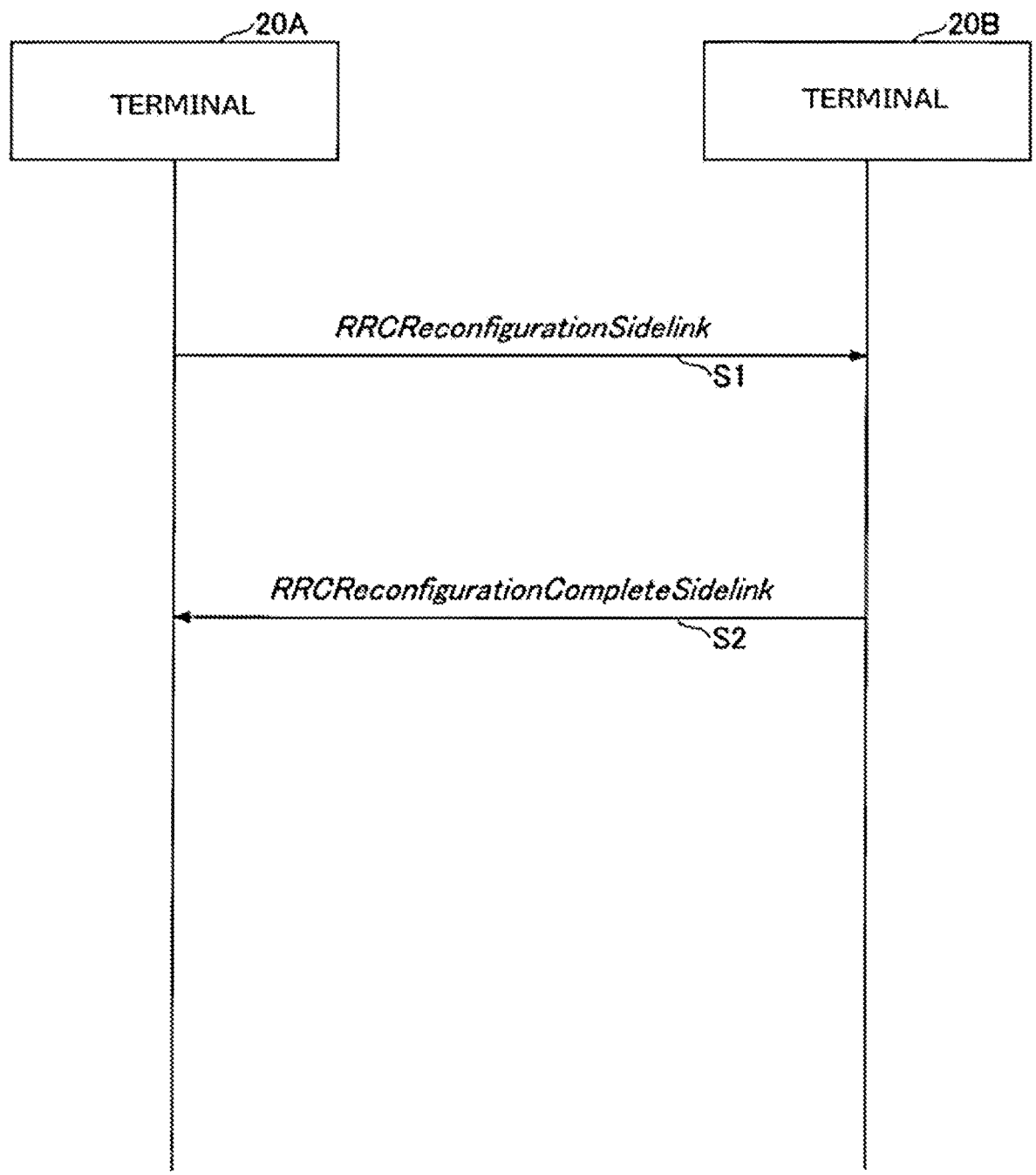
FIG. 16 is a sequence diagram illustrating an example of information indication in an embodiment of the present invention.

FIG. 16 is a sequence diagram illustrating an example of information indication according to an embodiment of the present invention. The information related to the power saving operation may be shared between the terminals 20 between which the PC5-RRC connection is established. The information related to the power saving operation may be, for example, any one or a combination of the following 1) to 4).

1) Information indicating that at least one of the transmission, reception, and sensing operations is performed only during a specific timing.

2) Information indicating whether or not to perform the power saving operation.

3) Information indicating the operation of a target for the power saving operation.

4) Information indicating which time resource the specific timing is, that is, information indicating a period during which the power saving operation is performed (or not performed), may be included.

In step S1 shown in FIG. 16, the terminal 20A transmits an "RRCReconfigurationSidelink" message including information related to the power saving operation to the terminal 20B. The "RRCReconfigurationSidelink" message may be replaced with another PC5-RRC signaling. For example, "RRCReconfigurationSidelink" may be replaced with "UECapabilityInformationSidelink". Subsequently, the terminal 20B transmits an "RRCReconfigurationCompleteSidelink" message to the terminal 20A.

In addition, indication of the information related to the power saving operation may be given from the terminal 20A to the terminal 20B by using at least one method of the above-described PC5-RRC signaling, MAC-CE, SCI, layer 1 ID, and layer 2 ID. The information related to the power saving operation may be associated with the layer 1 ID and the layer 2 ID in advance.

By indicating, to the counterpart terminal 20, the information related to the power saving information as described above, it is possible to perform an operation related to maintaining the PC5-RRC connection by referring to each other's information.

In a case where the terminal 20A and the terminal 20B are connected to each other by the RRC layer in the sidelink, where at least one of the terminal 20A and the terminal 20B performs at least one of transmission, reception, and sensing operations only during a specific timing, the operation related to the connection of the RRC layer based on the specific timing may be at least one of the following A) to L).

Figure 17:
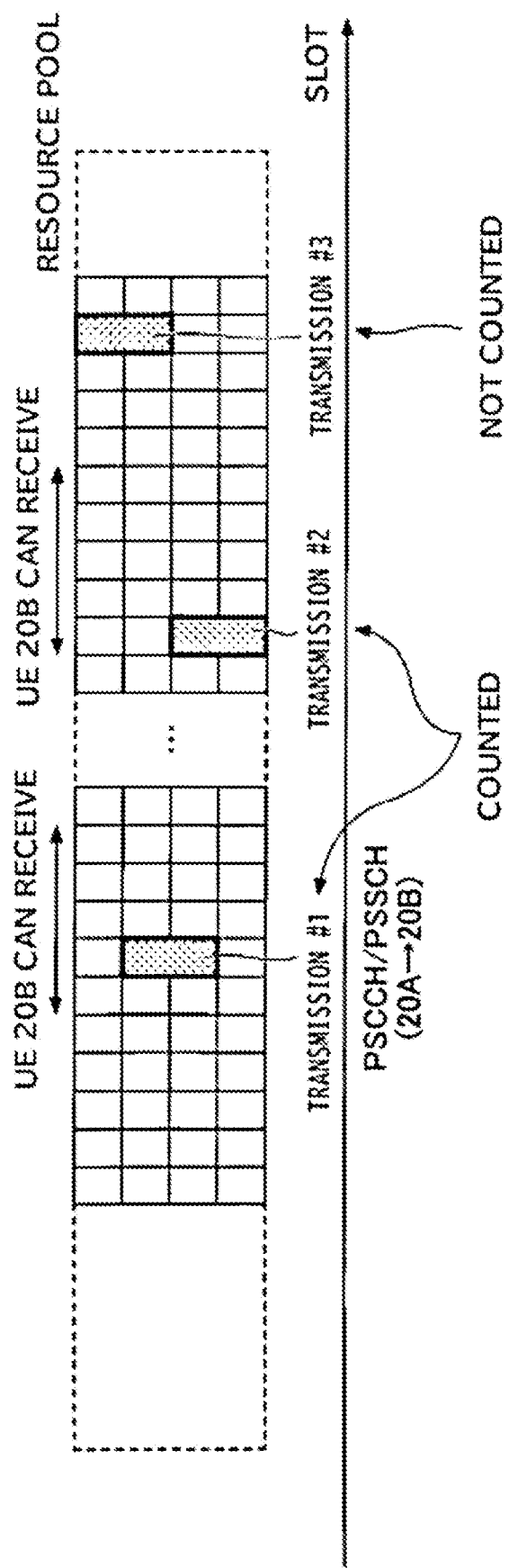
FIG. 17 is a diagram illustrating an example (1) of a transmission and reception operation in an embodiment of the present invention.

A) Regarding the maximum number of retransmissions $N_1$ that is one of RLF (Radio link failure) determinations, the number of retransmissions may be counted only for transmission or reception during the specific timing. FIG. 17 is a diagram illustrating an example (1) of the transmission and reception operation in an embodiment of the present invention. FIG. 17 shows an example in which the specific timing is a timing in which the reception of the terminal 20B is possible, and transmission #1 and transmission #2 are counted because these transmissions are included in the specific timing and transmission #3 is not counted because this transmission is not included in the specific timing.

B) The maximum number of retransmissions $N_1$ that is one of the RLF determinations may be configured by a parameter different from the maximum number of retransmissions $N_2$ in an operation in a section period other than the specific timing (for example, the operation of the terminal 20 that does not perform a power saving operation). For example, $N_1$ may be greater than $N_2$ ($N_1 > N_2$), or $N_1$ may be equal to or greater than $N_2$ ($N_1 \geq N_2$). In addition, for example, assuming that R is the ratio of receivable timings to all timings (receivable timings/all timings), $N_1$ may be determined based on R, or $N_1 = N_2/R$. Note that the definition of R is not limited to this.

As in A) and B) above, transmission during the timing in which it is assumed in advance that reception is not possible can be excluded from the operation related to maintaining the PC5-RRC connection.

Figure 18:
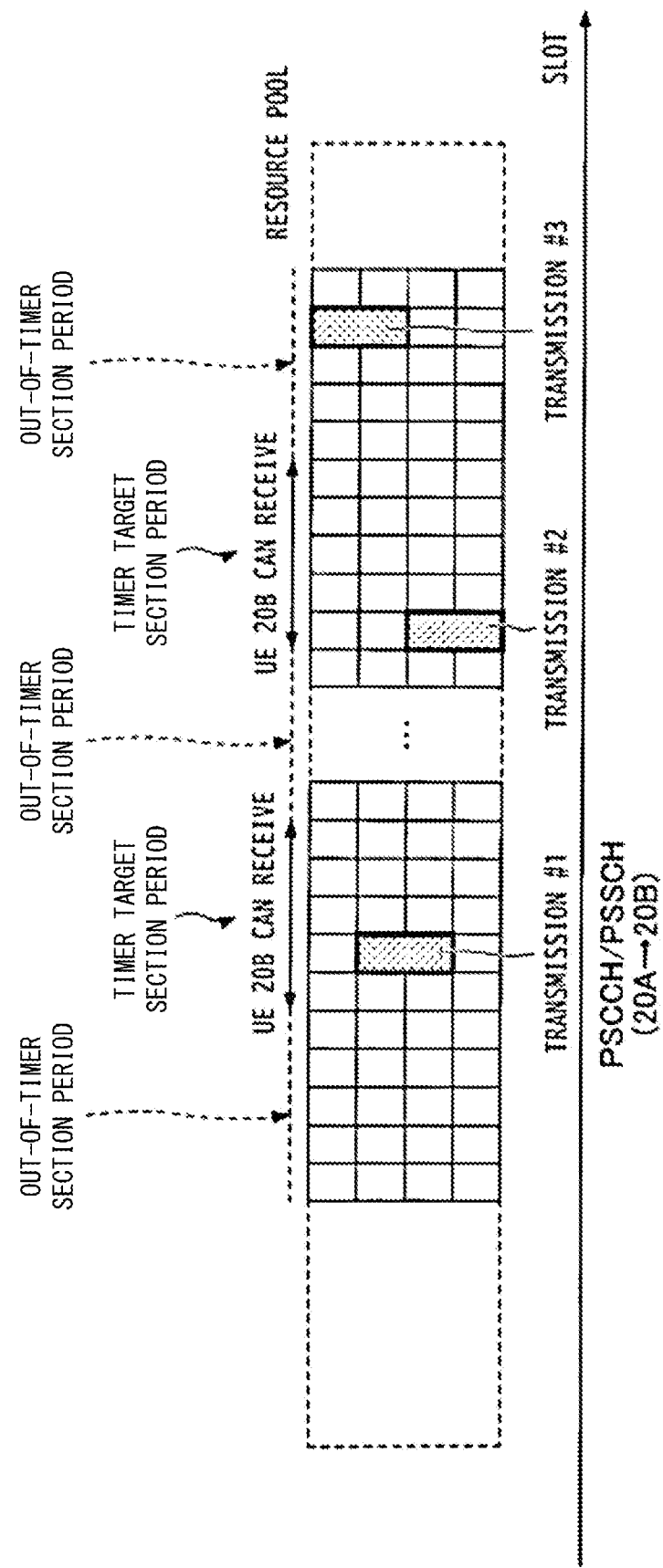
FIG. 18 is a diagram illustrating an example (2) of the transmission and reception operation in an embodiment of the present invention.

C) A timer (T400_1), which is one of the RLF determinations, may be enabled only during the specific timing. FIG. 18 is a diagram illustrating an example (2) of the transmission and reception operation in an embodiment of the present invention. FIG. 18 shows an example in which the specific timing is a timing in which the reception of the terminal 20B is possible, and the specific timing may be a section period in which the timer operates and a section period other than the specific timing may be a section period in which the timer does not operate or is stopped.

D) Regarding the timer (T400_1) that is one of the RLF determinations, the time until expiration may be configured to be different from the timer T400 in the operation in the section period other than the specific timing (for example, the operation of the terminal 20 that does not perform the power saving operation). For example, T400_1 may be greater than T400 (T400_1 > T400), or T400_1 may be equal to or greater than T400 (T400_1 $\geq$ T400). In addition, for example, assuming that R is the ratio of receivable timings to all timings (receivable timings/all timings), T400_1 may be determined based on R, or T400_1 = T400/R. Note that the definition of R is not limited to this.

As in C) and D) above, the timer operation during the timing in which it is assumed in advance that reception is not possible can be excluded from the operation related to maintaining the PC5-RRC connection.

E) Regarding the number of consecutive HARQ-DTX times that is one of the RLF determinations, the number of times may be counted only for the transmission or reception of PSFCH corresponding to the transmission or reception of data during the specific timing. That is, regarding the number of consecutive HARQ-DTX times, the number of times may not be counted for the transmission or reception of PSFCH corresponding to the transmission or reception of data in a section period other than the specific timing.

F) Regarding the number of consecutive HARQ-DTX times that is one of the RLF determinations, the number of times may be counted only for the transmission or reception of HARQ feedback, that is, PSFCH, during the specific timing. That is, regarding the number of consecutive HARQ-DTX times, the number of times may not be counted for the transmission or reception of HARQ feedback in a section period other than the specific timing.

G) The maximum value $M_1$ of the number of consecutive HARQ-DTX times that is one of the RLF determinations may be configured by a parameter different from the maximum value $M_2$ of the number of consecutive HARQ-DTX times in an operation in a section period other than the specific timing (for example, the operation of the terminal 20 that does not perform a power saving operation). For example, $M_1$ may be greater than $M_2$ ($M_1 > M_2$), and $M_1$ may be equal to or greater than $M_2$ ($M_1 \geq M_2$). In addition, for example, assuming that R is the ratio of receivable timings to all timings (receivable timings/all timings), $M_1$ may be determined based on R, or $M_1 = M_2/R$. Note that the definition of R is not limited to this.

H) Regarding the number of consecutive HARQ-DTX times that is one of the RLF determinations, the number of times may not be counted in the case of a HARQ-ACK mode in which only NACK is fed back, and the number of times may be counted only in the case of a HARQ feedback mode in which ACK and NACK are fed back. Whether or not the HARQ feedback mode is a mode in which only NACK is fed back, may be indicated to the reception-side terminal 20 or the transmission-side terminal 20 through the SCI.

I) Regarding the number of consecutive HARQ-DTX times that is one of the RLF determinations, the number of times may be counted only in a specific section period in the time domain. For example, the specific section period may be a section period in which the upper limit number of HARQ feedbacks for a PSCCH/PSSCH is defined.

As in E) to I) above, the HARK feedback during the timing in which it is assumed in advance that reception is not possible can be excluded from the operation related to maintaining the PC5-RRC connection.

J) Among the RLF determinations in the terminal 20 not related to the specific timing (for example, the terminal 20 that does not perform a power saving operation), at least one determination element need not be applied to the terminal 20 that implements the present embodiment. That is, at least one case of: a case where the maximum number of retransmissions is reached; a case where the timer (T400) expires; a case where the number of consecutive HARQ-DTX times reaches the maximum number of times; and a case where the PDCP entity of the sidelink fails the integrity check, which are RLF determination elements in a section period other than the specific timing, need not be applied to the RLF determination.

K) At least one of the following 1) to 5) may be defined as an operation for RLF determination in addition to or instead of at least one of the RLF determination in the terminal 20 not related to the specific timing (for example, the terminal 20 that does not perform a power saving operation) and/or the above A) to I).

1) In a case where the signal transmitted from the counterpart terminal 20 is not received for a predetermined time, RLF may be determined. For example, the predetermined time may be measured only during the specific timing.

2) In a case where the number of consecutive HARQ-DTX times reaches the maximum, RLF may be determined. However, in a case where the HARQ-ACK transmission from the counterpart terminal 20 to another terminal 20 can be received, determination as HARQ-DTX need not be made, and the number of consecutive HARQ-DTX times may be cleared.

3) Signal transmission with a specific period may be specified, configured, or indicated, and determination as RLF may be made in a case where the signal transmission cannot be received a specific number of times.

4) Signal transmission with a specific period may be specified, configured, or indicated, and determination as RLF may be made in a case where the HARQ feedback related to signal transmission cannot be received a specific number of times.

5) For specific data transmission, in a case where the transmission is not completed within the packet delay budget, determination as RLF may be made. For example, in a case where ACK cannot be received within the packet delay budget, determination as RLF may be made.

L) Transmission/reception (at least the first transmission) shown in the following 1) to 3) may be performed during the specific timing.

1) RRCReconfigurationSidelink message
2) RRCReconfigurationFailureSidelink message
3) RRCReconfigurationCompleteSidelink message For example, all of the above 1) to 3) may be transmitted and received during the specific timing. For example, the above 1) may be transmitted and received during any timing, and 2) and 3) may be transmitted and received during the specific timing. For example, information related to the specific timing may be included in the message of 1). For example, this may be information indicating which time resource is available for at least one of transmission, reception, and sensing.

As in J) to L) above, by setting the RLF determination or RRC message processing to an operation suitable for the terminal 20 that performs a power saving operation, the PC5-RRC connection can be appropriately maintained.

Note that the embodiment described above may be applied to the terminal 20 with configurations related to power saving. The terminal 20 with configurations related to power saving may be a terminal 20 that performs partial sensing or a terminal 20 configured (in advance) to perform partial sensing. Alternatively, the terminal 20 with configurations related to power saving may be a terminal 20 that performs a sensing method different from full sensing specified in Release 16, or may be a terminal 20 that does not perform sensing, or may be a terminal 20 that performs reception only in the limited time (for example, DRX).

Note that full sensing may mean sensing all resources in the sensing window. The sensing window may be specified by the slot section period $[n-T_0, n-T_{proc, 0}]$, and n may be a slot corresponding to the packet arrival timing.

In the embodiment described above, "in a case where at least one of the transmission operation, the reception operation, and the sensing operation is performed during a specific timing" may be replaced with "in a case where the configuration related to power saving is performed".

In the embodiment described above, the reception-side terminal 20 may be a plurality of terminals 20 or may belong to the same group.

In the embodiment described above, both the reception-side terminal 20 and the transmission-side terminal 20 may be the terminals 20 that perform a power saving operation.

The embodiment described above is not limited to the V2X terminal, and may be applied to a terminal that performs D2D communication.

Note that the transmission-side terminal 20 may be aware of the timing in which the reception by the reception-side terminal 20 is possible and/or the timing in which the transmission by the reception-side terminal 20 is possible. This may be known by determining the timing in the specifications or preset configurations, or may be known by receiving an indication from the reception-side terminal 20.

Note that, in the embodiment described above, the timing, that is, the time resource may be replaced with the frequency resource. For example, this may be applied to a case in which at least one of transmission, reception, and sensing is performed in some frequency resources (for example, some subchannels).

In addition, in the embodiment described above, the connection with another terminal in the RRC layer need not be limited to the RRC layer. For example, in the MAC layer, the connection with another terminal may be made.

According to the embodiment described above, because the terminal 20 performs RLF determination and HARQ feedback considering the power saving operation of the reception-side terminal 20, it is possible to implement unicast communication suitable for the PC5-RRC connection.

That is, in terminal-to-terminal direct communication, it is possible to implement unicast communication suitable for the power saving operation.

(Device Configuration)

Next, functional configuration examples of the base station 10 and the terminal 20 that execute the processes and the operations described so far will be described. The base station 10 and the terminal 20 have functions for implementing the embodiment described above. However, each of the base station 10 and the terminal 20 may have only some of the functions in the embodiment.

<Base Station 10>

Figure 19:
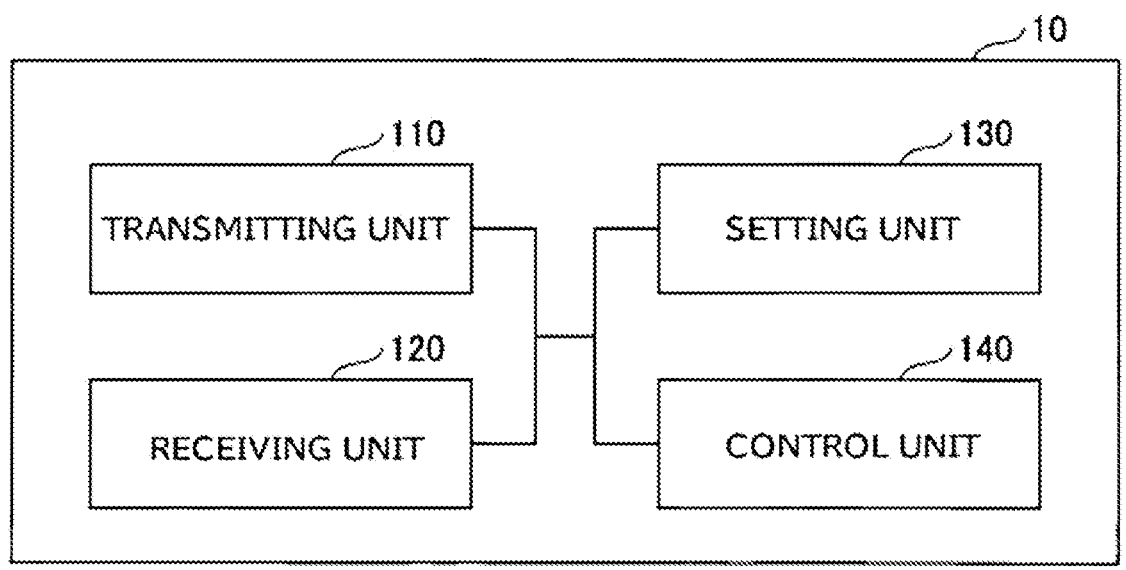
FIG. 19 is a diagram illustrating an example of the functional configuration of a base station 10 in an embodiment of the present invention.

FIG. 19 is a diagram showing an example of the functional configuration of the base station 10. As shown in FIG. 19, the base station 10 includes a transmitting unit 110, a receiving unit 120, a setting unit 130, and a control unit 140. The functional configuration shown in FIG. 19 is only an example. As long as the operation according to the embodiment of the invention can be performed, any functional division and any name of each functional unit may be applied.

The transmitting unit 110 has a function of generating a signal to be transmitted to the terminal 20 and transmitting the signal wirelessly. The receiving unit 120 has a function of receiving various signals transmitted from the terminal 20 and acquiring, for example, information of higher layers from the received signals. In addition, the transmitting unit 110 has a function of transmitting NR-PSS, NR-SSS, NR-PBCH, a DL/UL control signal, a DL reference signal, and the like to the terminal 20.

The setting unit 130 stores pre-configured setup information and various kinds of setup information to be transmitted to the terminal 20 in a storage device, and reads out the pieces of setup information from the storage device as necessary. The content of the setup information is, for example, information regarding the setting of D2D communication.

As described in the embodiment, the control unit 140 performs processing related to the setting for the terminal 20 to perform D2D communication. In addition, the control unit 140 transmits the scheduling of D2D communication and DL communication to the terminal 20 through the transmitting unit 110. In addition, the control unit 140 receives information regarding the HARQ response of the D2D communication and the DL communication from the terminal 20 through the receiving unit 120. A functional unit related to signal transmission in the control unit 140 may be included in the transmitting unit 110, and a functional unit related to signal reception in the control unit 140 may be included in the receiving unit 120.

<Terminal 20>

Figure 20:
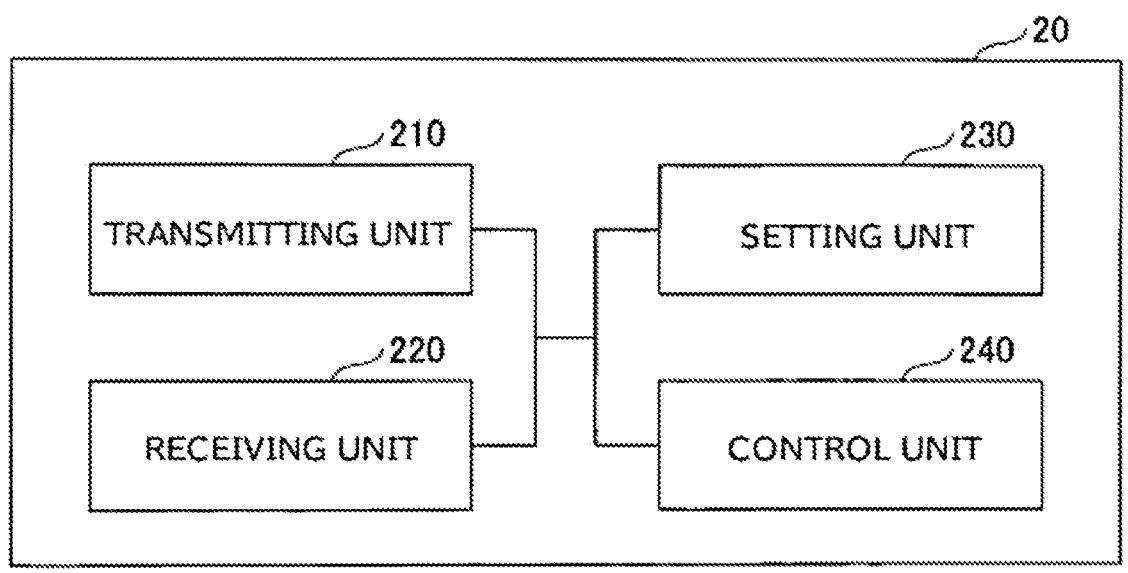
FIG. 20 is a diagram illustrating an example of the functional configuration of a terminal 20 in an embodiment of the present invention.

FIG. 20 is a diagram showing an example of the functional configuration of the terminal 20. As shown in FIG. 20, the terminal 20 includes a transmitting unit 210, a receiving unit 220, a setting unit 230, and a control unit 240. The functional configuration shown in FIG. 20 is merely an example. As long as the operation according to the embodiment of the invention can be performed, any functional division and any name of each functional unit may be applied.

The transmitting unit 210 generates a transmission signal from transmission data, and transmits the transmission signal wirelessly. The receiving unit 220 wirelessly receives various signals, and acquires a higher-layer signal from the received physical layer signal. In addition, the receiving unit 220 has a function of receiving NR-PSS, NR-SSS, NR-PBCH, a DL/UL/SL control signal, a reference signal, and the like transmitted from the base station 10. In addition, for example, the transmitting unit 210 transmits PSCCH (Physical Sidelink Control Channel), PSSCH (Physical Sidelink Shared Channel), PSDCH (Physical Sidelink Discovery Channel), PSBCH (Physical Sidelink Broadcast Channel), and the like to another terminal 20 as D2D communication, and the receiving unit 220 receives the PSCCH, the PSSCH, the PSDCH, the PSBCH, and the like from another terminal 20.

The setting unit 230 stores the various kinds of setup information, which have been received from the base station 10 or the terminal 20 by the receiving unit 220, in a storage device, and reads out the pieces of setup information from the storage device as necessary. In addition, the setting unit 230 stores the pre-configured setup information. The content of the setup information is, for example, information regarding the setting of D2D communication.

The control unit 240 controls D2D communication for establishing the RRC connection with another terminal 20 as described in the embodiment. In addition, the control unit 240 performs processing related to the power saving operation. In addition, the control unit 240 performs processing related to HARQ of D2D communication and DL communication. In addition, the control unit 240 transmits, to the base station 10, information regarding the HARQ response of the D2D communication and the DL communication from the base station 10 to another terminal 20 scheduled. In addition, the control unit 240 may perform the scheduling of the D2D communication to another terminal 20. In addition, the control unit 240 may autonomously select a resource to be used in the D2D communication from the resource selection window based on the sensing result. In addition, the control unit 240 performs processing related to power saving in transmission and reception of the D2D communication. A functional unit related to signal transmission in the control unit 240 may be included in the transmitting unit 210, and a functional unit related to signal reception in the control unit 240 may be included in the receiving unit 220.

(Hardware Configuration)

The block diagrams (FIGS. 19 and 20) used in the description of the above embodiment show blocks in functional units. These functional blocks (configuration units) are realized by any combination of at least one of hardware and software. In addition, a method of realizing each functional block is not particularly limited. That is, each functional block may be realized using one physically or logically coupled device, or may be realized by connecting two or more physically or logically separated devices directly or indirectly (for example, using a wired or wireless connection) and using the plurality of devices. Each functional block may be realized by combining the above-described one device or the above-described plurality of devices with software.

Functions include determining, judging, calculating, computing, processing, deriving, investigating, searching, ascertaining, receiving, transmitting, outputting, accessing, resolving, selecting, choosing, establishing, comparing, assuming, expecting, regarding, broadcasting, notifying, communicating, forwarding, configuring, reconfiguring, allocating, mapping, assigning, and the like, but are not limited thereto. For example, a functional block (configuration unit) that makes the transmission work is called a transmitting unit or a transmitter. In any case, as described above, the implementation method is not particularly limited.

Figure 21:
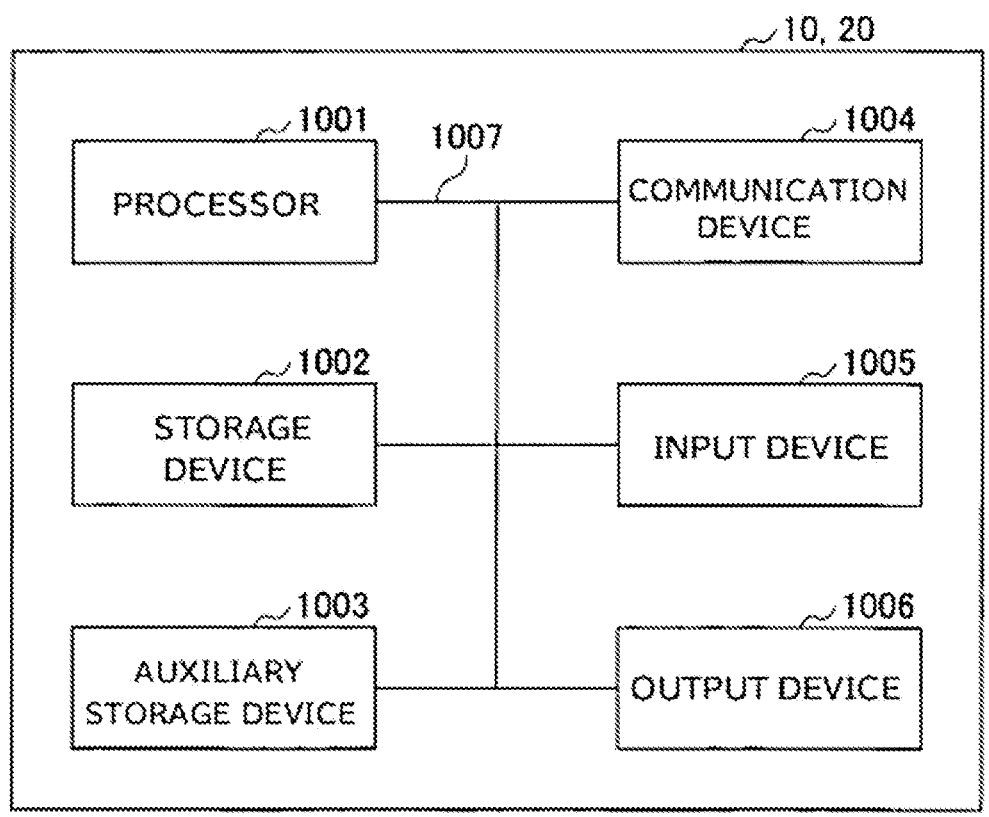
FIG. 21 is a diagram illustrating an example of the hardware configuration of the base station 10 or the terminal 20 in an embodiment of the present invention.

For example, the base station 10, the terminal 20, and the like according to an embodiment of the present disclosure may function as a computer that performs processing of the radio communication method according to the present disclosure. FIG. 21 is a diagram showing an example of the hardware configuration of the base station 10 and the terminal 20 according to an embodiment of the present disclosure. Each of the base station 10 and the terminal 20 described above may be physically configured as a computer apparatus including a processor 1001, a storage device 1002, an auxiliary storage device 1003, a communication device 1004, an input device 1005, an output device 1006, a bus 1007, and the like.

In addition, in the following description, the term "device" can be read as a circuit, a unit, and the like. The hardware configuration of each of the base station 10 and the terminal 20 may be configured to include one or more devices for each of the devices shown in the diagram, or may be configured not to include some devices.

Each function in the base station 10 and the terminal 20 is realized by reading predetermined software (program) onto hardware, such as the processor 1001 and the storage device 1002, so that the processor 1001 performs an operation and controlling communication by the communication device 1004 or controlling at least one of reading and writing of data in the storage device 1002 and the auxiliary storage device 1003.

The processor 1001 controls the entire computer by operating an operating system, for example. The processor 1001 may be configured by a central processing unit (CPU) including an interface with peripheral equipment, a control device, an operation device, a register, and the like. For example, the control unit 140, the control unit 240, and the like described above may be realized by the processor 1001.

In addition, the processor 1001 reads a program (program code), a software module, data, and the like into the storage device 1002 from at least one of the auxiliary storage device 1003 and the communication device 1004, and executes various kinds of processing according to these. As the program, a program causing a computer to execute at least a part of the operation described in the above embodiment is used. For example, the control unit 140 of the base station 10 shown in FIG. 19 may be realized by a control program that is stored in the storage device 1002 and operated by the processor 1001. In addition, for example, the control unit 240 of the terminal 20 shown in FIG. 20 may be realized by a control program that is stored in the storage device 1002 and operated by the processor 1001. Although it has been described that the various kinds of processing described above are executed by one processor 1001, the various kinds of processing described above may be executed simultaneously or sequentially by two or more processors 1001. The processor 1001 may be implemented by one or more chips. In addition, the program may be transmitted from a network through a telecommunication line.

The storage device 1002 is a computer-readable recording medium, and may be configured by at least one of, for example, a ROM (Read Only Memory), an EPROM (Erasable Programmable ROM), an EEPROM (Electrically Erasable Programmable ROM), and a RAM (Random Access Memory). The storage device 1002 may be called a register, a cache, a main memory, and the like. The storage device 1002 can store a program (program code), a software module, and the like that can be executed to execute the communication method according to an embodiment of the present disclosure.

The auxiliary storage device 1003 is a computer-readable recording medium, and may be configured by at least one of, for example, an optical disc such as a CD-ROM (Compact Disc ROM), a hard disk drive, a flexible disk, and a magneto-optical disk (for example, a compact disk, a digital versatile disk, and a Blu-ray (Registered trademark) disk), a smart card, a flash memory (for example, a card, a stick, a key drive), a floppy (registered trademark) disk, and a magnetic strip. The storage medium described above may be, for example, a database including at least one of the storage device 1002 and the auxiliary storage device 1003, a server, or other appropriate media.

The communication device 1004 is hardware (transmitting and receiving device) for performing communication between computers through at least one of a wired network and a radio network, and is also referred to as, for example, a network device, a network controller, a network card, and a communication module. The communication device 1004 may be configured to include, for example, a high-frequency switch, a duplexer, a filter, a frequency synthesizer, and the like in order to realize at least one of frequency division duplex (FDD) and time division duplex (TDD), for example. For example, a transmitting and receiving antenna, an amplifier unit, a transmitting and receiving unit, a transmission line interface, and the like may be realized by the communication device 1004. The transmitting and receiving unit may be implemented so as to be physically or logically separated from the transmitting unit and the receiving unit.

The input device 1005 is an input device (for example, a keyboard, a mouse, a microphone, a switch, a button, and a sensor) for receiving an input from the outside. The output device 1006 is an output device (for example, a display, a speaker, and an LED lamp) that performs output to the outside. In addition, the input device 1005 and the output device 1006 may be integrated (for example, a touch panel).

In addition, respective devices, such as the processor 1001 and the storage device 1002, are connected to each other by the bus 1007 for communicating information. The bus 1007 may be configured using a single bus, or may be configured using a different bus for each device.

In addition, each of the base station 10 and the terminal 20 may be configured to include hardware, such as a microprocessor, a digital signal processor (DSP), an ASIC (Application Specific Integrated Circuit), a PLD (Programmable Logic Device), and an FPGA (Field Programmable Gate Array), and some or all of the functional blocks may be realized by the hardware. For example, the processor 1001 may be implemented using at least one of these hardware components.

Summary of Embodiment

As described above, according to the embodiment of the invention, there is provided a terminal including: a control unit configured to connect to another terminal in an RRC (Radio Resource Control) layer; and a transmitting unit configured to transmit data to the another terminal. In a case where the another terminal or the terminal itself performs at least one of transmission, reception, and sensing during a specific timing, the control unit controls an operation related to the connection in the RRC layer, based on the specific timing.

With the above configuration, the terminal 20 performs RLF determination and HARQ feedback considering the power saving operation of the reception-side terminal 20, so that it is possible to implement unicast communication suitable for the PC5-RRC connection. That is, in terminal-to-terminal direct communication, it is possible to implement unicast communication suitable for the power saving operation.

A receiving unit configured to receive, from the another terminal, information indicating that the another terminal performs at least one of transmission, reception, and sensing during the specific timing or information indicating the specific timing may be further provided. With this configuration, it is possible to perform RLF determination and HARQ feedback considering the power saving operation of the reception-side terminal 20.

The receiving unit may receive HARQ (Hybrid automatic repeat request) feedback for the data from the another terminal, and the control unit may determine a link failure of the RRC layer, based on only the HARQ feedback related to the specific timing. With this configuration, it is possible to perform RLF determination and HARQ feedback considering the power saving operation of the reception-side terminal 20.

The control unit may determine a link failure of the RRC layer, based on a timer related to the specific timing. With this configuration, it is possible to perform RLF determination considering the power saving operation of the reception-side terminal 20.

The transmitting unit may transmit a message in the RRC layer only during the specific timing. With this configuration, it is possible to reliably transmit an indication of the RRC message considering the power saving operation of the reception-side terminal 20.

As described above, according to the embodiment of the invention, there is provided a communication method in which a terminal executes: connecting to another terminal in an RRC (Radio Resource Control) layer; and transmitting data to the another terminal. The connecting includes controlling, in a case where the another terminal or the terminal itself performs at least one of transmission, reception, and sensing during a specific timing, an operation related to the connection in the RRC layer, based on the specific timing.

With the above configuration, the terminal 20 performs RLF determination and HARQ feedback considering the power saving operation of the reception-side terminal 20, so that it is possible to implement unicast communication suitable for the PC5-RRC connection. That is, in terminal-to-terminal direct communication, it is possible to implement unicast communication suitable for the power saving operation.

Supplement to Embodiments

While the embodiments of the invention have been described above, the disclosed invention is not limited to such embodiments, and those skilled in the art will understand various variations, modifications, alternatives, substitutions, and the like. Although the description has been made using specific numerical examples to facilitate the understanding of the invention, those numerical values are merely examples and any appropriate values may be used unless otherwise specified. The division of the items in the above description is not essential to the invention, and the matters described in two or more items may be used in combination as necessary, or the matter described in a given item may be applied to the matter described in another item (unless there is a contradiction). The boundaries between functional units or processing units in the functional block diagrams do not always correspond to the boundaries between physical components. The operation of a plurality of functional units may be physically performed by one component, or the operation of one functional unit may be physically performed by a plurality of components. In the processing procedure described in the embodiment, the order of the processing may be changed as long as there is no contradiction. Although the base station 10 and the terminal 20 have been described using functional block diagrams for the sake of convenience of description of the processing, such equipment may be realized by hardware, software, or a combination thereof. The software operated by the processor of the base station 10 according to the embodiment of the invention and the software operated by the processor of the terminal 20 according to the embodiment of the invention may be stored in a random access memory (RAM), a flash memory, a read only memory (ROM), an EPROM, an EEPROM, a register, a hard disk (HDD), a removable disk, a CD-ROM, a database, a server, or any other appropriate storage media.

In addition, the indication of information is not limited to the aspect/embodiment described in the present disclosure, and may be performed using other methods. For example, the indication of information may be performed using physical layer signaling (for example, DCI (Downlink Control Information), UCI (Uplink Control Information)), higher layer signaling (for example, RRC (Radio Resource Control) signaling, MAC (Medium Access Control) signaling, broadcast information (MIB (Master Information Block), SIB (System Information Block)), other signals, or a combination thereof. In addition, the RRC signaling may be called an RRC message, and may be, for example, an RRC connection setup message or an RRC connection reconfiguration message.

Each aspect/embodiment described in the present disclosure may be applied to at least one of systems, which use LTE (Long Term Evolution), LTE-A (LTE-Advanced), SUPER 3G, IMT-Advanced, 4G (4th generation mobile communication system), 5G (5th generation mobile communication system), FRA (Future Radio Access), and NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), and other appropriate systems, and next-generation systems extended based on these. In addition, a plurality of systems may be combined (for example, a combination of 5G and at least one of LTE and LTE-A) to be applied.

In the processing procedure, sequence, flowchart, and the like in each aspect/embodiment described in this specification, the order may be changed as long as there is no contradiction. For example, for the methods described in the present disclosure, elements of various steps are presented using an exemplary order, and the invention is not limited to the specific order presented.

The specific operation described as being performed by the base station 10 in this specification may be performed by its upper node in some cases. In a network including one or more network nodes each having the base station 10, it is obvious that various operations performed for communication with the terminal 20 can be performed by at least one of the base station 10 and other network nodes (for example, MME, S-GW, and the like can be considered, but the network node is not limited thereto) other than the base station 10. Although the case where the number of other network nodes other than the base station 10 is one has been exemplified above, the other network nodes may be a combination (for example, MME and S-GW) of a plurality of other network nodes.

Information or signals described in the present disclosure can be output from a higher layer (or a lower layer) to a lower layer (or a higher layer). Information or signals described in the present disclosure may be input and output through a plurality of network nodes.

Information or the like that is input and output may be stored in a specific place (for example, a memory) or may be managed using a management table. The information or the like that is input and output can be overwritten, updated, or added. The information or the like that is output may be deleted. The information or the like that is input may be transmitted to another device.

The judging in the present disclosure may be performed based on a value expressed by 1 bit (0 or 1), may be performed based on Boolean (true or false), or may be performed by numerical value comparison (for example, comparison with a given value).

Software, regardless of whether this is called software, firmware, middleware, microcode, a hardware description language, or any other name, should be interpreted broadly to mean instructions, instruction sets, codes, code segments, program codes, programs, subprograms, software modules, applications, software applications, software packages, routines, subroutines, objects, executable files, execution threads, procedures, functions, and the like.

In addition, software, instructions, information, and the like may be transmitted and received through a transmission medium. For example, in a case where software is transmitted from a website, a server, or other remote sources using at least one of the wired technology (coaxial cable, optical fiber cable, twisted pair, digital subscriber line (DSL), and the like) and the wireless technology (infrared, microwave, and the like), at least one of the wired technology and the wireless technology is included within the definition of the transmission medium.

The information, signals, and the like described in the present disclosure may be expressed using any of a variety of different technologies. For example, data, instructions, commands, information, signals, bits, symbols, and chips that can be referred to throughout the above description may be represented by voltage, current, electromagnetic waves, magnetic field or magnetic particles, light field or photon, or any combination thereof.

In addition, the terms described in the present disclosure and the terms necessary for understanding the present disclosure may be replaced with terms having the same or similar meaning. For example, at least one of the channel and the symbol may be a signal (signaling). In addition, the signal may be a message. In addition, a component carrier (CC) may be called a carrier frequency, a cell, a frequency carrier, or the like.

The terms "system" and "network" used in the present disclosure are used interchangeably.

In addition, the information, parameters, and the like described in the present disclosure may be expressed using an absolute value, may be expressed using a relative value from a predetermined value, or may be expressed using another corresponding information. For example, the radio resource may be indicated by an index.

The names used for the parameters described above are not limiting names in any way. In addition, equations and the like using these parameters may be different from those explicitly disclosed in the present disclosure. Since various channels (for example, a PUCCH and a PDCCH) and information elements can be identified by any suitable names, various names allocated to these various channels and information elements are not limiting names in any way.

In the present disclosure, terms such as "base station (BS)", "radio base station", "base station", "fixed station", "NodeB", "eNodeB (eNB)", "gNodeB (gNB)", "access point", "transmission point", "reception point", "transmission/reception point", "cell", "sector", "cell group", "carrier", and "component carrier" can be used interchangeably. The base station may also be referred to as terms, such as a macro cell, a small cell, a femtocell, and a picocell.

The base station can include one or more (for example, three) cells. When the base station includes a plurality of cells, the entire coverage area of the base station can be divided into a plurality of smaller areas, and each of the smaller area can also provide a communication service using a base station subsystem (for example, a remote radio head (RRH)). The term "cell" or "sector" refers to a part or the entirety of the coverage area of at least one of a base station and a base station subsystem that provides communication services in this coverage.

In the present disclosure, the terms such as "mobile station (MS)", "user terminal", "user equipment (UE)", and "terminal" can be used interchangeably.

The mobile station may also be called a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or some other appropriate terms depending on those skilled in the art.

At least one of the base station and the mobile station may be called a transmitting device, a receiving device, a communication device, and the like. In addition, at least one of the base station and the mobile station may be a device mounted on a moving body, the moving body itself, and the like. The moving body may be a vehicle (for example, a car or an airplane), an unmanned moving body (for example, a drone or a self-driving car), or a robot (maned or unmanned). In addition, at least one of the base station and the mobile station necessarily includes a device that does not move during a communication operation. For example, at least one of the base station and the mobile station may be an IoT (Internet of Things) device, such as a sensor.

In addition, the base station in the present disclosure may be read as a user terminal. For example, each aspect/embodiment of the present disclosure may be applied to a configuration in which communication between a base station and a user terminal is replaced with communication between a plurality of terminals 20 (which may be called, for example, D2D (Device-to-Device) or V2X (Vehicle-to-Everything)). In this case, the terminal 20 may have the above-described function of the base station 10. In addition, terms such as "uplink" and "downlink" may be read as terms corresponding to terminal-to-terminal communication (for example, "side"). For example, an uplink channel, a downlink channel, and the like may be read as a side channel.

Similarly, the user terminal in the present disclosure may be read as a base station. In this case, the base station may have the above-described function of the user terminal.

The terms "determining" used in the present disclosure may involve a wide variety of operations. For example, "determining" can include considering judging, calculating, computing, processing, deriving, investigating, looking up (search, inquiry) (for example, looking up in a table, database, or another data structure), and ascertaining as "determining". In addition, "determining" can include considering receiving (for example, receiving information), transmitting (for example, transmitting information), input, output, accessing (for example, accessing data in a memory) as "determining". In addition, "determining" can include considering resolving, selecting, choosing, establishing, comparing, and the like as "determining". In other words, "determining" can include considering any operation as "determining". In addition, "determining" may be read as "assuming", "expecting", "considering", and the like.

The terms "connected" and "coupled" or variations thereof mean any direct or indirect connection or coupling between two or more elements, and can include a case where one or more intermediate elements are present between two elements "connected" or "coupled" to each other. The coupling or connection between elements may be physical, logical, or a combination thereof. For example, "connection" may be read as "access". When used in the present disclosure, two elements can be considered to be "connected" or "coupled" to each other using at least one of one or more wires, cables, and printed electrical connections and using some non-limiting and non-inclusive examples, such as electromagnetic energy having wavelengths in a radio frequency domain, a microwave domain, and a light (both visible and invisible) domain.

The reference signal may be abbreviated as RS (Reference Signal), and may be called Pilot according to the applied standard.

The description "based on" used in the present disclosure does not mean "based only on" unless otherwise specified. In other words, the description "based on" means both "based only on" and "based at least on".

Any reference to elements using designations such as "first" and "second" used in the present disclosure does not generally limit the quantity or order of the elements. These designations can be used in the present disclosure as a convenient method for distinguishing between two or more elements. Therefore, references to first and second elements do not mean that only two elements can be adopted or that the first element should precede the second element in any way.

"Means" in the configuration of each device described above may be replaced with "unit", "circuit", "device", and the like.

When "include", "including", and variations thereof are used in the present disclosure, these terms are intended to be inclusive similarly to the term "comprising". In addition, the term "or" used in the present disclosure is intended not to be an exclusive-OR.

A radio frame may be configured by one or more frames in the time domain. Each of one or more frames in the time domain may be referred to as a subframe. In addition, the subframe may be configured by one or more slots in the time domain. The subframe may be a fixed time length (for example, 1 ms) that does not depend on numerology.

Numerology may be a communication parameter applied to at least one of transmission and reception of a given signal or channel. Numerology may indicate at least one of, for example, subcarrier spacing (SCS), bandwidth, symbol length, cyclic prefix length, transmission time interval (TTI), the number of symbols per TTI, radio frame configuration, specific filtering processing performed in the frequency domain by the transceiver, and specific windowing processing performed in the time domain by the transceiver.

A slot may be configured by one or more symbols (OFDM (Orthogonal Frequency Division Multiplexing) symbol, SC-FDMA (Single Carrier Frequency Division Multiple Access) symbol, and the like) in the time domain. A slot may be a time unit based on numerology.

A slot may include multiple mini-slots. Each mini-slot may be configured by one or more symbols in the time domain. In addition, the mini-slot may be called a subslot. A mini-slot may be configured by a smaller number of symbols than that in a slot. A PDSCH (or a PUSCH) transmitted in time units larger than the mini-slot may be referred to as PDSCH (or PUSCH) mapping type A. A PDSCH (or a PUSCH) transmitted using a mini-slot may be referred to as PDSCH (or PUSCH) mapping type B.

Each of the radio frame, the subframe, the slot, the mini-slot, and the symbol indicates a time unit when transmitting a signal. The radio frame, the subframe, the slot, the mini-slot, and the symbol may have different names corresponding thereto.

For example, one subframe may be called a transmission time interval (TTI), a plurality of consecutive subframes may be called a TTI, and one slot or one mini-slot may be called a TTI. That is, at least one of the subframe and the TTI may be a subframe (1 ms) in the known LTE, a period (for example, 1 to 13 symbols) shorter than 1 ms, or a period longer than 1 ms. In addition, the unit indicating the TTI may be called a slot, a mini-slot, or the like, instead of a subframe.

Here, the TTI refers to, for example, a minimum time unit of scheduling in radio communication. For example, in the LTE system, the base station performs scheduling for allocating radio resources (frequency bandwidth, transmission power, and the like that can be used in each terminal 20) to each terminal 20 in TTI units. In addition, the definition of the TTI is not limited to this.

The TTI may be a transmission time unit, such as a channel-encoded data packet (transport block), a code block, and a code word, or may be a processing unit, such as scheduling and link adaptation. In addition, when a TTI is given, a time section (for example, the number of symbols)

in which a transport block, a code block, a code word, and the like are actually mapped may be shorter than the TTI.

In addition, when one slot or one mini-slot is called a TTI, one or more TTIs (that is, one or more slots or one or more mini-slots) may be a minimum time unit for scheduling. In addition, the number of slots (the number of mini-slots) configuring the minimum time unit of the scheduling may be controlled.

A TTI having a time length of 1 ms may be called a normal TTI (TTI in LTE Rel. 8-12), a long TTI, a normal subframe, a long subframe, a slot, and the like. A TTI shorter than the normal TTI may be called a short TTI, a partial or fractional TTI, a short subframe, a mini-slot, a subslot, a slot, and the like.

In addition, a long TTI (for example, a normal TTI or a subframe) may be read as a TTI having a time length exceeding 1 ms, and a short TTI may be read as a TTI shorter than the TTI length of the long TTI and equal to or longer than 1 ms.

A resource block (RB) is a resource allocation unit in the time domain and the frequency domain, and may include one or more consecutive subcarriers in the frequency domain. The number of subcarriers included in the RB may be the same regardless of numerology, and may be, for example, 12. The number of subcarriers included in the RB may be determined based on numerology.

In addition, the time domain of the RB may include one or more symbols, and may be the length of one slot, one mini-slot, one subframe, or one TTI. One TTI, one subframe, and the like may each be configured by one or more resource blocks.

In addition, one or more RBs may be called a physical resource block (PRB: Physical RB), a sub-carrier group (SCG), a resource element group (REG), a PRB pair, an RB pair, and the like.

In addition, the resource block may be configured by one or more resource elements (REs). For example, one RE may be a radio resource area of one subcarrier and one symbol.

A bandwidth part (BWP) (which may be called a partial bandwidth or the like) may indicate a subset of consecutive common resource blocks (RBs) for given numerology in a given carrier. Here, the common RB may be specified by an index of the RB with the common reference point of the carrier as a reference. The PRB may be defined by a given BWP and numbered within the BWP.

The BWP may include a BWP for UL (UL BWP) and a BWP for DL (DL BWP). For the terminal 20, one or more BWPs may be set in one carrier.

At least one of the set BWPs may be active, and it may not be assumed that the terminal 20 transmits and receives a predetermined signal/channel outside the active BWP. In addition, "cell", "carrier", and the like in the present disclosure may be read as "BWP".

The structures of the radio frame, the subframe, the slot, the mini-slot, and the symbol described above are merely examples. For example, the number of subframes included in a radio frame, the number of slots per subframe or radio frame, the number of mini-slots included in a slot, the number of symbols and RBs included in a slot or mini-slot, the number of subcarriers included in an RB, the number of symbols in the TTI, the symbol length, the cyclic prefix (CP) length, and the like can be changed in various ways.

In the present disclosure, in a case where articles, for example, a, an, and the in English, are added by translation, the present disclosure may include that nouns subsequent to these articles are plural.

In the present disclosure, the expression "A and B are different" may mean "A and B are different from each other". In addition, the expression may mean that "A and B each are different from C". Terms such as "separate", "coupled" may be interpreted similarly to "different".

Each aspect/embodiment described in the present disclosure may be used alone, may be used in combination, or may be switched and used according to execution. In addition, the indication of predetermined information (for example, indication of "X") is not limited to being explicitly performed, and may be performed implicitly (for example, without the indication of the predetermined information).

In addition, in the present disclosure, PSCCH/PSSCH is an example of data.

While the present disclosure has been described in detail, it is apparent to those skilled in the art that the present disclosure is not limited to the embodiments described in the present disclosure. The present disclosure can be implemented as modified and changed aspects without departing from the spirit and scope of the present disclosure defined by the description of the claims. Therefore, the description of the present disclosure is intended for illustrative purposes, and has no restrictive meaning to the present disclosure.

EXPLANATIONS OF LETTERS OR NUMERALS

10 BASE STATION
110 TRANSMITTING UNIT
120 RECEIVING UNIT
130 SETTING UNIT
140 CONTROL UNIT
20 TERMINAL
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a transmitting unit configured to transmit information indicating an operation of discontinuous reception by another terminal to the another terminal that performs the discontinuous reception; and
a control unit configured to control a timing of transmitting an RRC message to the another terminal via an interface between terminals, based on a specific timing determined based on the information, the specific timing being a specific timing at which the another terminal performs at least one of reception or sensing,
wherein the control unit autonomously determines a resource for transmitting the RRC message.

2. The terminal according to claim 1, wherein the specific timing is a timing at which a timer operates that is related to a section period in which the another terminal performs at least one of reception or sensing.

3. The terminal according to claim 1, further comprising:
a receiving unit configured to receive a sidelink UE capability indication including information indicating whether or not the another terminal performs an operation related to discontinuous reception.

4. A communication method in which a terminal executes:
transmitting information indicating an operation of discontinuous reception by another terminal to the another terminal that performs the discontinuous reception;
controlling a timing of transmitting an RRC message to the another terminal via an interface between terminals, based on a specific timing determined based on the information, the specific timing being a specific timing at which the another terminal performs at least one of reception or sensing; and
autonomously determining a resource for transmitting the RRC message.

\* \* \* \* \*